United States Patent
Zhou et al.

(10) Patent No.: US 11,831,250 B2
(45) Date of Patent: Nov. 28, 2023

(54) MULTIPLE-SWITCH TYPES HYBRID PEBB POWER CONVERTER

(71) Applicant: General Electric Company, Schenectady, NY (US)

(72) Inventors: Zhi Zhou, Niskayuna, NY (US); Steven Mankevich, Cranberry Township, PA (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 17/358,065

(22) Filed: Jun. 25, 2021

(65) Prior Publication Data
US 2021/0344283 A1 Nov. 4, 2021

Related U.S. Application Data

(63) Continuation-in-part of application No. PCT/US2020/030413, filed on Apr. 29, 2020.

(51) Int. Cl.
*H02M 7/5387* (2007.01)
*H02M 3/158* (2006.01)
*H02M 7/53846* (2007.01)
*H02M 5/458* (2006.01)

(52) U.S. Cl.
CPC ..... *H02M 7/53875* (2013.01); *H02M 3/1582* (2013.01); *H02M 7/538466* (2013.01)

(58) Field of Classification Search
CPC .... H02M 7/53; H02M 7/537; H02M 7/53875; H02M 7/538466; H02M 5/40; H02M 5/42; H02M 5/453; H02M 5/458; H02M 5/4585
See application file for complete search history.

(56) References Cited

U.S. PATENT DOCUMENTS

| 6,696,823 B2 | 2/2004 | Ledenev |
| 6,798,670 B2 | 9/2004 | King |
| 8,467,199 B2 * | 6/2013 | Lee .................. H02M 3/33584 363/21.04 |

(Continued)

FOREIGN PATENT DOCUMENTS

EP 3484042 A1 * 5/2019 ............... H02J 1/12

OTHER PUBLICATIONS

International Search Report and the Written Opinion of the International Searching Authority, or the Declaration from International Appl. No. PCT/US2020/030413, dated Jul. 23, 2020.

*Primary Examiner* — Gary L Laxton
(74) *Attorney, Agent, or Firm* — WOOD IP LLC

(57) ABSTRACT

A multi-switch types hybrid power electronics build block (MST HPEBB) least replaceable unit converter employs a first low voltage side (for example, 1000 volt power switches) and a second high voltage side (for example, 3000 volt power switches). The MST HPEBB LRU employs multiple bridge converters connected in series and/or in parallel, and coupled in part by a 1:1 transformer. To reduce weight and volume requirements compared to known PEBB LRUs, different power switch types are employed in different bridge converters. For example, in one exemplary embodiment, low voltage 1.7 kVolt SiC MOSFETS may be employed on the lower voltage side, while at least some 4.5 kVolt Silicon IGBTs may be employed on the high voltage side.

13 Claims, 13 Drawing Sheets

(56) References Cited

U.S. PATENT DOCUMENTS

| | | |
|---|---|---|
| 9,257,916 B2 | 2/2016 | Cheng |
| 9,461,554 B2 * | 10/2016 | Fu .................. H02M 3/1582 |
| 10,978,871 B2 | 4/2021 | Zhou |
| 11,128,222 B2 * | 9/2021 | Itogawa ............ H02M 3/33573 |
| 2017/0185130 A1 * | 6/2017 | Zhang ................ H01L 29/1608 |

* cited by examiner

MULTIPLE-SWITCH TYPES HYBRID PEBB POWER CONVERTER

I. CROSS-REFERENCE TO RELATED APPLICATIONS

This patent application is a continuation-in-part of pending PCT application number PCT/US20/30413, filed Apr. 29, 2020, Applicant GE Energy Power Conversion Technology Limited, entitled "Power Electronics Building Blocks (PEBBs) With Enhanced Power Density, Reduced Size, Isolated Power Ports", and portions of this application repeat a substantial portion of the prior application number PCT/US20/30413. This continuation-in-part patent application also adds additional disclosure not presented in the prior application PCT/US20/30413.

This patent application is related to co-pending, co-assigned PCT application PCT/US20/26026, "Cooling Systems For Enhanced Power Density Transformers", filed Mar. 31, 2020.

II. FIELD OF THE INVENTION

The present subject matter relates generally to high-power electronics power systems, and more particularly to high power converters for converting voltages or currents in high-power electrical power systems. The subject matter further relates to power electronics building blocks (PEBBs) which are fundamental elements of modular and scalable power converters.

III. BACKGROUND OF THE INVENTION

PEBB Overview: Medium-to-high power systems may provide electricity for large industrial plants, factories, large vehicles (such as large ships and airplanes), office buildings, apartment blocks, or entire cities. Power conversion systems, or power converters, transform electric power in medium and high power electronic distributed power buses and grids, for example: converting higher voltages to lower voltages; converting lower voltages to higher voltages; converting electricity from one alternating current frequency to another; or converting from direct current to alternating current, or alternating current to direct current. The present system and method is particularly though not exclusively suited for microgrids such as those found on ships and airplanes. (Grids and microgrids are generally referred to in this document as "power systems.")

Electrical power systems generally consist of generation, transmission, distribution and end use elements. Power is supplied by an electric generator or generators, or by renewable energy systems such as solar power. En route to its final load (devices which use the electric power), the power is typically received and transmitted on by one or more power converters. For example, a generator-side converter can receive alternating current (AC) power from the generator via a stator bus and can convert the AC power to a suitable output frequency, such as the grid frequency. The AC power is provided to the electrical grid via a line bus.

Low, medium, and high voltages are not rigidly defined, but for example the term "low voltage" may refer to voltages less than or equal to 1.5 kV, "medium voltage" may refer to voltages greater than 1.5 kV and less than 100 kV, and high voltage may refer to voltages at 100 kV and above.

A Power Electronic Building Block (PEBB) is a structural and functional element of a power converter, and may be any power processor that converts any input electrical power to the desired voltage, current, and frequency output. PEBBs are intended for use as part of a modular and scalable power converter architecture typically employing multiple interconnected PEBBs. Each PEBB may be used in various power applications with all its interfaces and operational settings configurable.

A PEBB typically incorporates power devices, gate drives, and other components into a building block with: (i) a configurable and clearly defined functionality, (ii) standardized hardware, (iii) control interfaces, and (iv) interoperability with other PEBBs.

Power Converters for Ships and Other Environments With Compact Space Requirements: Certain environments, such as military and commercial ships and aircrafts, place a premium on the utilization of space. As a result, ships require power converters which are more compact than those which may be employed in land-based environments. It is also desirable to reduce the weight of power conversion systems for maritime applications. Reductions in power converter volume and power converter weight lead to both improved power density and less drag on a ship.

For maritime application, both government- and industry-initiated PEBB research and development efforts have focused on the PEBB 1000 building block, also referred to as the "PEBB 1000 Least/Line Replaceable Unit" (hereinafter, "PEBB 1000 LRU").

In a known hardware configuration, a PEBB 1000 LRU has three or four power conversion stages with a high frequency solid state transformer positioned in the middle. An existing, modular three or four stage PEBB 1000 LRU will have DC or AC voltages of one approximately 1 kVolt (1 kV) (or less) on both sides of the PEBB 1000. The high frequency (HF) transformer in the middle of the legacy PEBB 1000 LRU has a 1:1 (unity) winding ratio which may have certain benefits in legacy power uses: symmetry, simplicity, and common parts/components (that is, a convention or standard of a 1:1 ratio transformer) for different PEBB 1000 LRUs.

Internally, this existing PEBB 1000 LRU hardware configuration also leverages matured and available 1.2 kV or 1.7 kV rated SiC MOSFET and/or 1.2 kV or 1.7 kV IGBT devices for switching. Known legacy PEBB 1000 LRUs are commonly rated at 85 kW to 125 kW in power, and provide voltages ranging from 680V-to-1 kV DC or from 480V AC to 707V AC.

For one megawatt (1 MW) or less power applications, and for a 12 kV or below power applications, a common or unified hardware configuration is typically architected using twelve (12) PEBB 1000 LRUs with paralleled or cascaded connections on each side of the PEBB 1000 LRU (depending on application's voltage requirements). Typically, legacy maritime power converters (involving pulse loads, energy storage, and energy magazines) employ twelve PEBB 1000 LRUs in the converter, and are rated for conversion of 1 kV DC to 450V AC; 1 kV DC to 4160V AC; 1 kV DC to 6 kV DC; or 1 kV DC to 12 kV DC PEBB.

Such legacy power converters typically have the same number (12) of PEBB LRUs. In these applications, 12 PEBB LRUs are needed to be able to "stack/scale up" or to be networked to obtain a 1 MW rated output power for a legacy power converter. While the PEBB 1000 LRU-based power converter is more power-dense than the traditional/classical bulk (or non-modular) power converter of equivalent ratings and functionality, PEBB 1000 LRUs and converters become "voltage-limited" as the application voltages increase beyond 12 kV for 1 MW rated converters. To meet high medium voltage requirement, converters may have to be oversized in power, thereby sacrificing power density for rated applications.

Problem Addressed by the Parent (PCT '0624) Application: The parent application to this present continuation-in-part application is pending PCT application #PCT/IB2020/050624, filed 28 Jan. 2020, applicant GE Energy Power Conversion Technology Limited, entitled "Power Electronics Building Blocks (PEBBs) With Enhanced Power Density, Reduced Size, Isolated Power Ports"-hereinafter, the "PCT '0624 application", the "'0624 application", or simply "'0624".

The parent PCT '0624 application addressed the following problem: For reasons of energy-efficiency and effective ship-board space utilization, it is desirable to provide for a PEBB LRU, where twelve PEBB LRUs may be combined to obtain higher output voltages, higher output currents, and/or higher output power than is obtained with current PEBB 1000 LRUs. In some embodiments, it is desirable to have a PEBB LRU which is designed and configured so that fewer than twelve such PEBB LRUs are needed to create a power converter which achieves existing output voltages, currents, and/or power.

Given the aforementioned deficiencies, such as for example volumetric power density challenges with the PEBB 1000, a need exists for a PEBB LRU as a modular components of a power converter, to support a power converter which can step-up high power voltages and deliver more power while not requiring additional PEBB LRUs as compared to known power converter configurations. A need also exists for a PEBB LRU as a modular components of a power converter, to support a power converter which can step-up high power voltages and deliver more power while not requiring additional space in space-constrained applications, such as power systems for ships.

Summary of Solutions of the Parent Application: The parent application to this application (the PCT '0624 application"), provided for solutions to the above problem with multiple different embodiments which are summarized here, and which are also retained and discussed in detail below in the present application.

In one embodiment, a hybrid power electronics build block (PEBB) least/line replaceable unit (LRU) converter employs a first low voltage side (for example, with 1000 volt MOSFETS or modules) and a second high voltage side (for example, with 6000 volt MOSFETS or modules). A high frequency transformer with an 1-to-N winding ratio, with N>1, provides coupling between the two sides. Ratios of K:N may be employed, where K is less than Z (K<Z), and with the K windings on the lower voltage side of the coupling and the Z windings on the higher voltage side. In exemplary embodiments, winding ratios of 1:2, 1:3, 1:4, 1:5, 1:6, or other ratios may be employed.

In various embodiments, high power conversion may be achieved from AC-to-AC electric power, or from AC-to-DC, DC-to-AC, or DC-to-DC. The system minimizes the weight and volume requirements of the converter, and also reduces the input power required to generate output power at different voltages; that is, it reduces hardware volume while increasing the power density of the hardware.

In an embodiment, a PEBB LRU suitable for power conversion in compact-space applications, such as maritime applications, reduces the number of LRUs required in a power converter and therefore reduce the total volume and weight of PEBB converters, which in turn improves power density for higher than 12 kV medium voltage applications. In an embodiment, a modular and scalable 1 MW power converter may be constructed based on a common/standard topology with 12 PEBB LRUs for all current and future ship power system platforms (such as 450 Vac, 4160 Vac, 6 kVdc, 12 kVdc, 12+kVdc, and 13.8 kVac) for the US Navy and commercial marine applications. A unified or standardized configuration for PEBB LRUs within a converter provides commonality of PEBB LRU design and power converter design for a variety of power system platforms or applications.

In one embodiment, the present system is a PEBB LRU with: (i) a first end which has a low-voltage power stage for power transmission at a first voltage, the first end having a low-voltage switch configured to carry the first voltage; (ii) a second end which includes a high-voltage power stage for power transmission at a second voltage, where the second voltage is higher than the first voltage, and where the high-voltage second power stage includes a high-voltage switch capable of carrying the second, higher voltage; and (iii) a transformer having a first winding which is electrically connected to the low-first power stage and a second winding which is electrically connected to the high-power stage end, the first winding having an integer number of turns K and the second winding having an integer number of turns N, so that the turns ratio of the first winding to the second winding is K:N, where N is an integer value greater than the integer value of K.

In an embodiment, a PEBB LRU so configured may transfer electric power within from either the first end to the second end or transfer electric power from the second end to the first end, so that either end of the PEBB LRU may be used to receive power from a power source or to provide power to a load, with the other end capable of providing power to a load or receiving power from a source. (It will be understood that in application, only one end of a PEBB LRU may, at a given time, receive power while only the other end provides power.) In an alternative embodiment of the present system, one end of the LRU is configured to receive electric power from a power source, and the other end is only configured only to provide electric power to a load.

In this document, for brevity and convenience of reference, exemplary PEBB LRUs according to the previously taught system of the PCT '0624 application may be referred to as "PEBB X000 LRUs", where X can be (replaced/substituted with) 2, 3, or 6, or other integer values, and X000 represents a voltage greater than 1000 volts. In some exemplary embodiments X000 may for example be six thousands (6000) volts, but other voltages (including for example and without limitation 2000 or 3000 volts) may be envisioned as well. For further convenience and brevity of reference, a "PEBB X000 LRU" may also be referred to as a "PEBBXk", for example PEBB2k or PEBB6k. For reasons which will become apparent upon further discussion below, exemplary PEBB LRUs according to the present system may also be referred to as "Hybrid PEBB LRUs" or simply HPEBBs; for convenience and consistency, the terms "hybrid PEBB LRU", "HPEBB LRU", or simply "HPEBB" will typically be employed in this document. All such terminology as enumerated in this paragraph is equivalent throughout this document.

In some embodiments, the present system and method may employ multiple power output junctures of the HPEBB for regulated and unregulated power.

Due to the increased power densities, achieved, some embodiments of the present system and method may employ novel cooling systems to dissipate heat. For example, a variety of embodiments of the present system and method may employ liquid cooling systems associated with the power transformer of the HPEBB. A variety of embodiments of the present system and method may employ just one liquid coolant, while other embodiments may employ two or more liquid coolants in various cooling configurations.

While exemplary embodiments described herein typically refer to an HPEBB configured to received 1000 volts and deliver 6000 volts, or even high voltages, some embodiments of the present system and method may be employed for lower power PEBB LRUs as well, for example an HPEBB receiving 500 volts and delivering 2000, or delivering 3000 volts, or higher voltages; or even PEBB LRUs rated for still lower power applications.

Problem Addressed by the Present Application: Component Availability. The present application addresses in part the same problems as the parent application, namely: The need for high-power generation and conversion with reduced space requirements and/or reduced weight requirements. The present system and method as taught in this document addresses some aspects of the problem which may not have been fully addressed by the parent PCT '0624 application. Specifically:

The parent PCT '0624 application teaches the use of high voltage Silicon Carbide (SiC) MOSFET devices and modules; but at the time of filing on this present application, only lower-voltage SiC MOSFETs (1.7 kVolt and lower) are well-established for commercial uses. The high voltage (greater than 1.7 kVolt) SiC MOSFET devices and modules are still in a general development stage. The technology has not matured at the time of this filing, and so the high voltage SiC MOSFET devices and modules are not readily and cost effectively available at the time of this filing and may not be generally commercially available until some unknown time in the future.

In order to overcome this problem, an alternative, matured, readily available technology is employed in some modules or parts of the present system. Specifically, available, known, and reliable commercial off-the-shelf (COTS) high voltage (greater than 1.7 kV) Si IGBTs are used in this HPEBB invention.

More generally, it is known in the art that fundamental switching components (BJTs, IGBTs, and MOSFETs) may be categorized as different types depending on the electrical materials employed in their composition. For example, some switching components may be considered to be strictly silicon (SI)-based devices, which others may be categorized as Silicon-Carbon (SiC) based devices. As known in the art, otherwise similar devices with different material compositions may have distinctly different properties in terms of, for example, maximum voltage they can carry, maximum currents they can carry, maximum switching speeds and/or maximum frequencies, reliability, stability, heat tolerance, manufacturing costs, and other performance factors. Further, for a given maximum frequency tolerance, voltage rating, current rating, and/or overall power rating, different fundamental types of switches may differ in their physical size, physical weight, the amount of heat generated by the components, and other tangible factors which affect real-world design considerations.

Due to the complexity of many electrical systems, with dozens or hundreds of different components, it is often not apparent which selections of device types, and/or which combinations of different device types in a single system, will result in optimum performance of an electrical system as a whole.

The innovative approach of the present system and method overcomes the component availability hurdle of the prior art (including that of the parent PCT '0624 application) without sacrificing performance. The present system and method solves the high cost and unreliability challenges of the medium-to-high voltage SiC MOSFET devices/modules which may in limited availability at present. In addition, the present system and method reduces the number of LRUs and therefore reduces the total volume and weight of PEBB converters, which in turn improves power density for higher than 12 kV medium voltage applications. This is critically important for the PEBB converter to be able to fit into the very tight spaces on board military and commercial ships.

IV. BRIEF SUMMARY OF THE INVENTION

In embodiments previously disclosed in the parent PCT '0624 application, the high-end power side of an exemplary PEBB is implemented as for example 10 kV SiC switches 115.2. (See for example FIG. 1 of the present application, which illustrates the high-end side of the PEBB (which is the right-hand or (B) side of the figure.) In some embodiments the high-power switches 115.2 are implemented as a MOSFET (metal-oxide semiconductor field effect transistor) in parallel with a diode, as illustrated in FIG. 1.

(It is noted here that, in the parent PCT '0624 application, the term "power switch 115" is at points used as referring to the Silicon (Si) IGBT (insulated gate bipolar transistor) along with its parallel diode. There is no substantive difference in structure or operations, the term "power switch" is defined in each application as best serves the needs of clarity for each application.)

The present system and method extends and complements the invention described in the PCT '0624 application by using Silicon (Si) IGBT instead of Silicon Carbide (SiC) MOSFET modules on the high-voltage end 105.2 of the Hybrid PEBB (HPEBB), while still employing SiC MOSFET devices or modules on the low voltage (A) side of the HPEBB. Consequently, the present system and method employs dual power device types-Silicon IGBTs as well as the previously employed SiC MOSFETS—to create a modular and scalable hybrid PEBB which can be implemented with currently available technology.

The high-voltage Si IGBT modules of the present system and method are a matured and reliable commercial-off-the-shelf (COTS) technology. These matured Si IGBT elements allow the present-day production of practical, cost-effective Multi-Device Type (MST) HPEBBs, with significant commercial advantages over the high voltage (greater than 1.7 kV) SiC MOSFET modules taught in the parent PCT '0624 application.

V. BRIEF DESCRIPTION OF THE DRAWINGS

Advantageous designs of embodiment of the present invention result from independent and dependent claims, the description, and the drawings. In the following, preferred examples of embodiments of the invention are explained in detail with the aid of the attached drawings. The drawings, which are incorporated herein and form part of the specification, illustrate the present invention and, together with the description, further serve to explain the principles of the invention and to enable a person skilled in the relevant art(s) to make and use the invention.

Figure 3A:
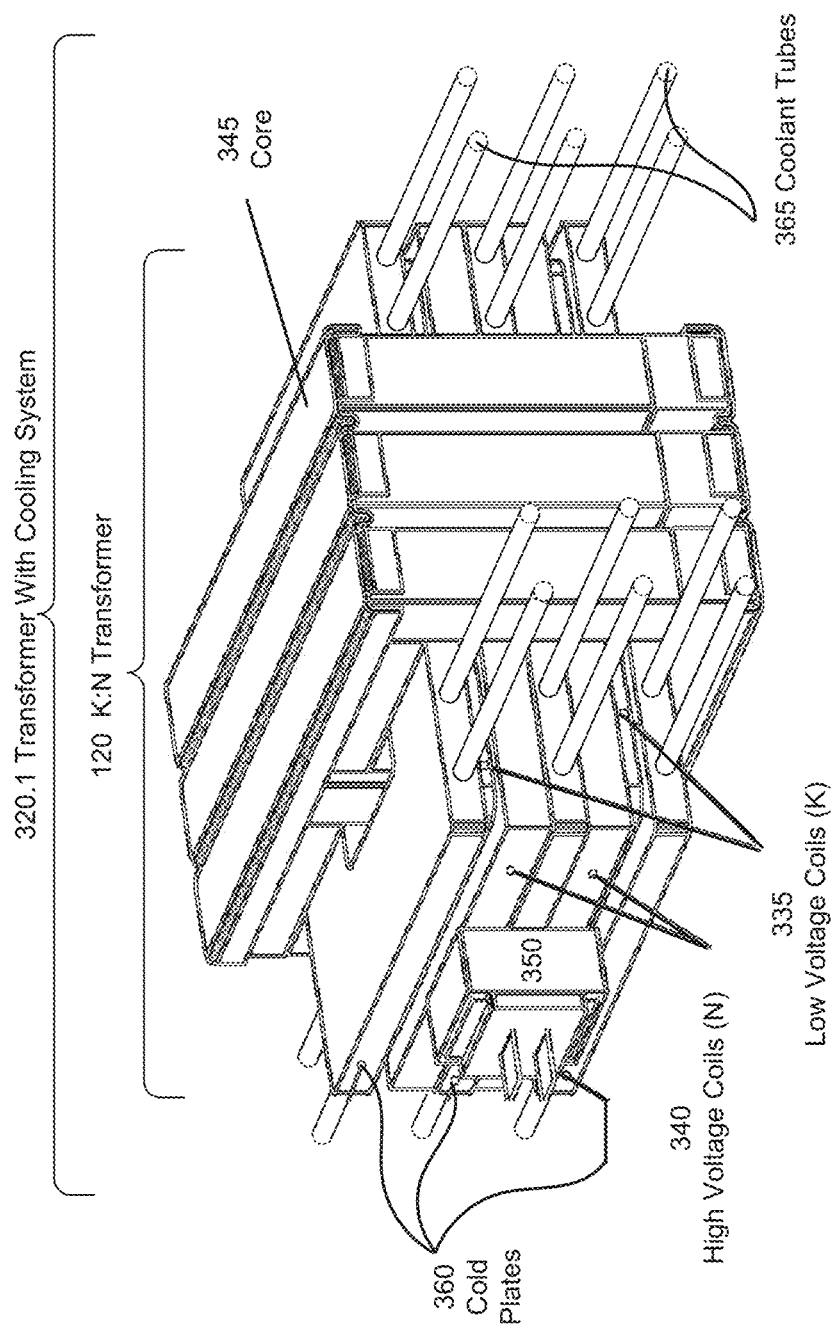

FIG. 3A provides a schematic illustration of some elements of an exemplary high frequency transformer with a liquid cooling system (LCS) according to one or more embodiments of the present system and method as presented in the parent '0624 application.

Figure 3B:
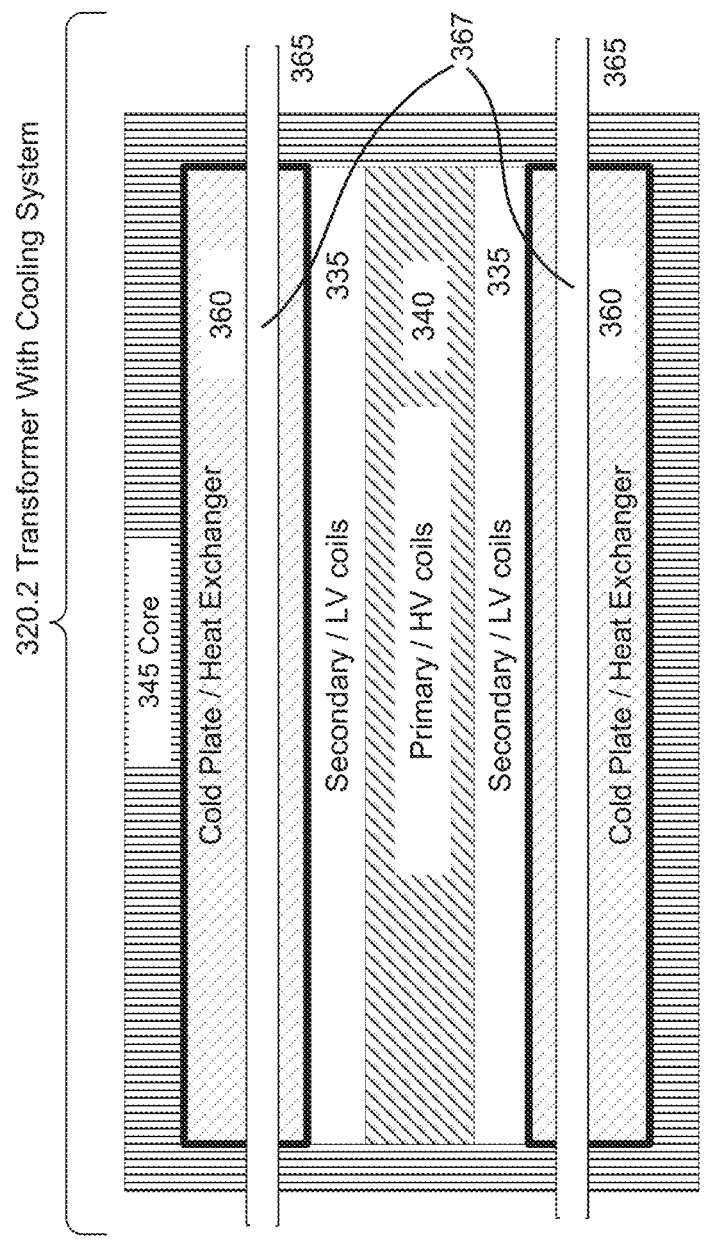

FIG. 3B provides a schematic illustration of some elements of an exemplary high frequency transformer with a liquid cooling system (LCS) according to one or more embodiments of the present system and method as presented in the parent '0624 application.

Figure 4A:
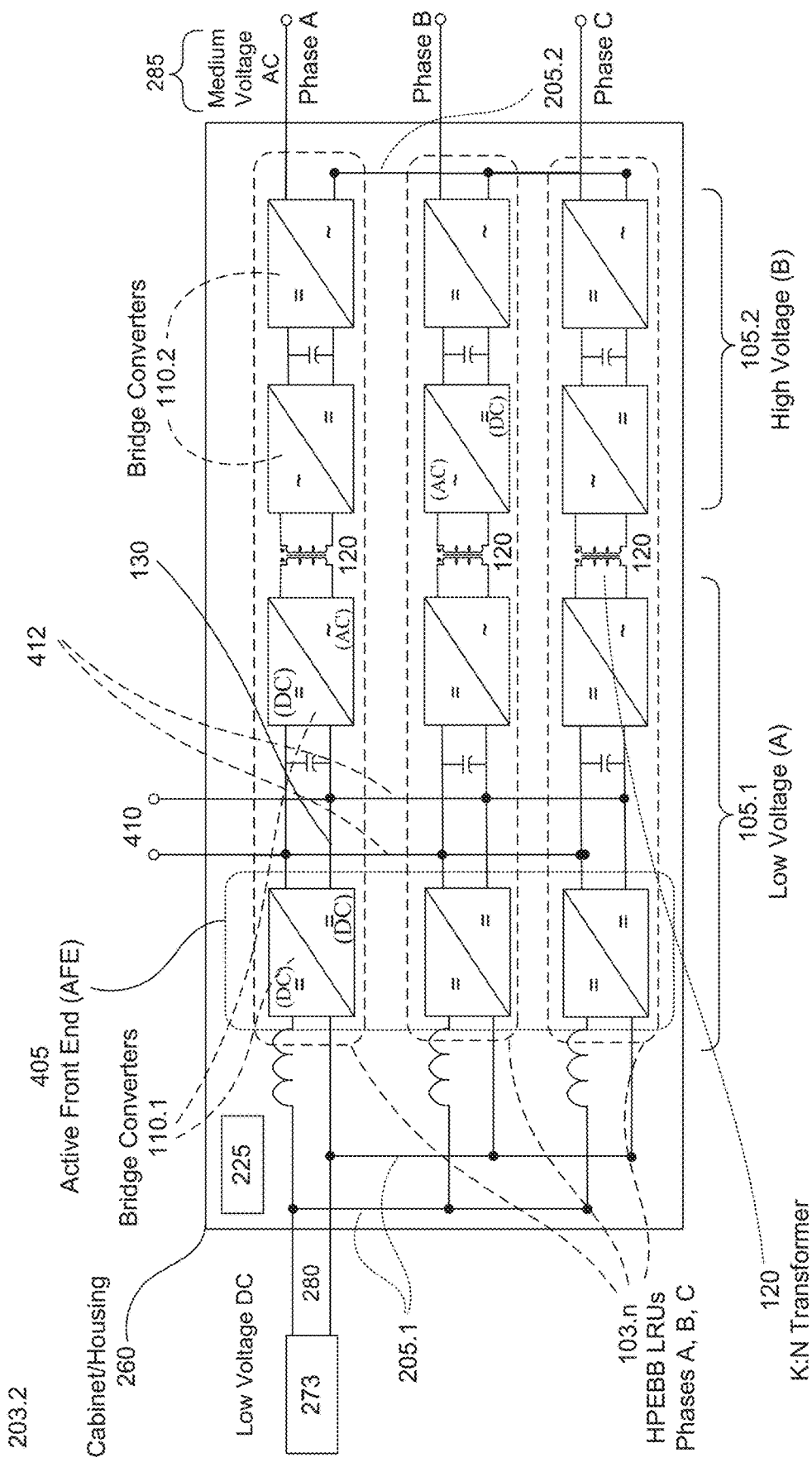

FIG. 4A illustrates an exemplary power converter which includes multiple hybrid power electronics building block line replacement unit (HPEBB LRUs) according to one or more embodiments of the present system and method as presented in the parent '0624 application.

Figure 4B:
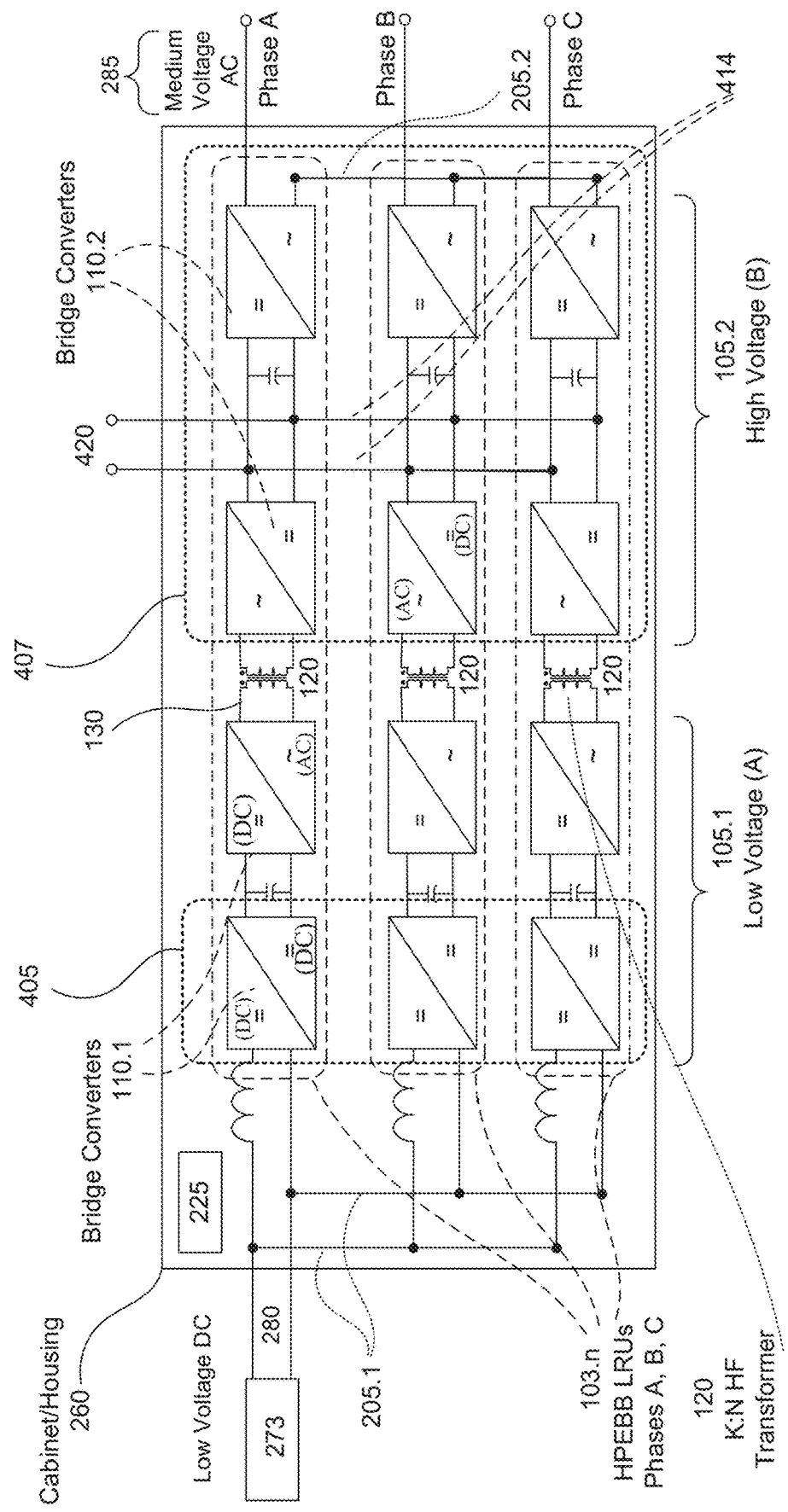

FIG. 4B illustrates an exemplary power converter which includes multiple hybrid power electronics building block line replacement unit (HPEBB LRUs) with a common regulated MVDC output on the high voltage side according to one or more embodiments of the present system and method as presented in the parent '0624 application.

Figure 5:
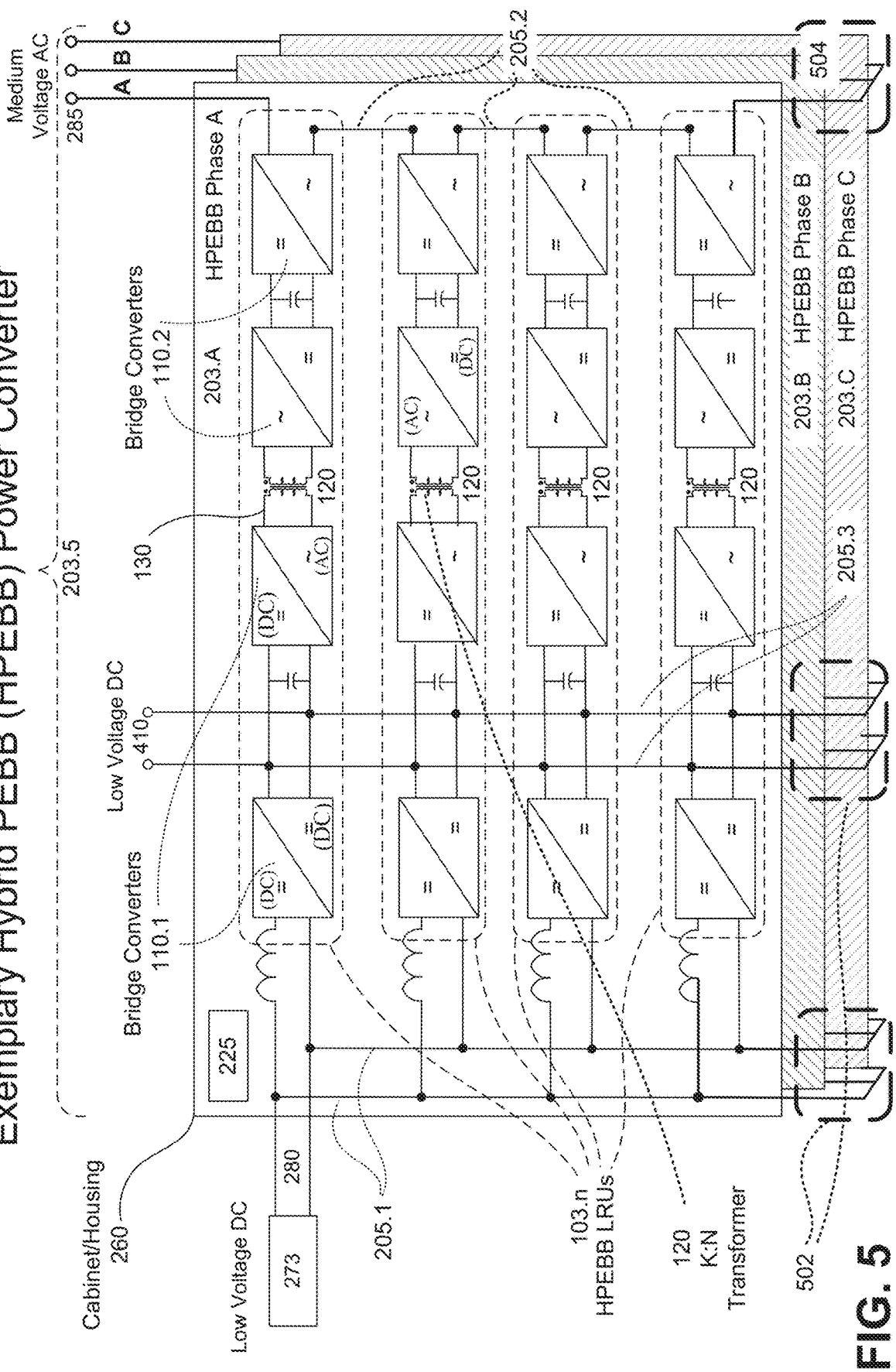

FIG. 5 illustrates an exemplary full megawatt scale power converter which includes multiple hybrid power electronics building block line replacement units (HPEBB LRUs) according to one or more embodiments of the present system and method as presented in the parent '0624 application.

Figure 6:
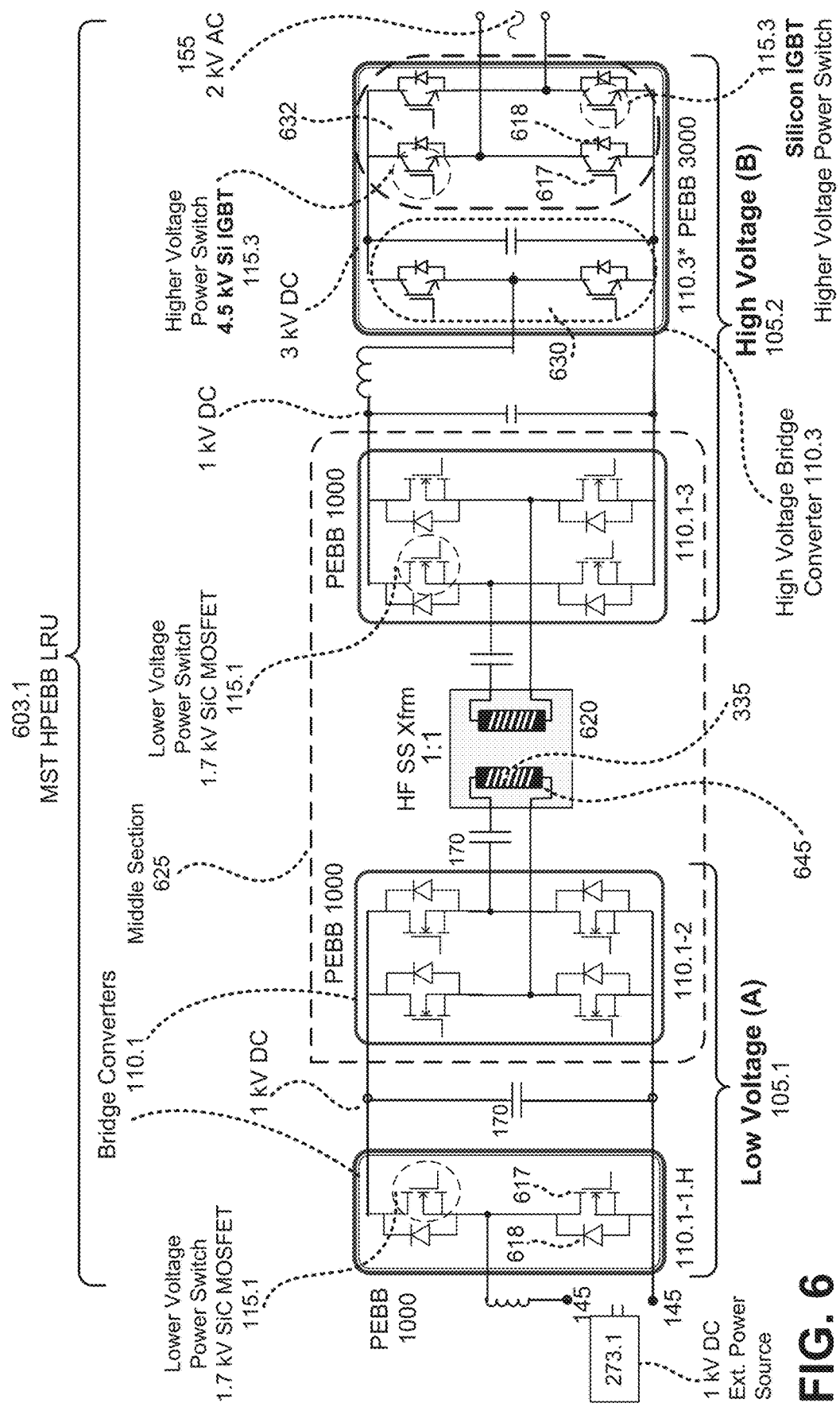

FIG. 6 illustrates an exemplary multi-switch types hybrid power electronics building block line replacement unit (MST HPEBB LRU) according to one or more embodiments of the present system and method.

Figure 7:
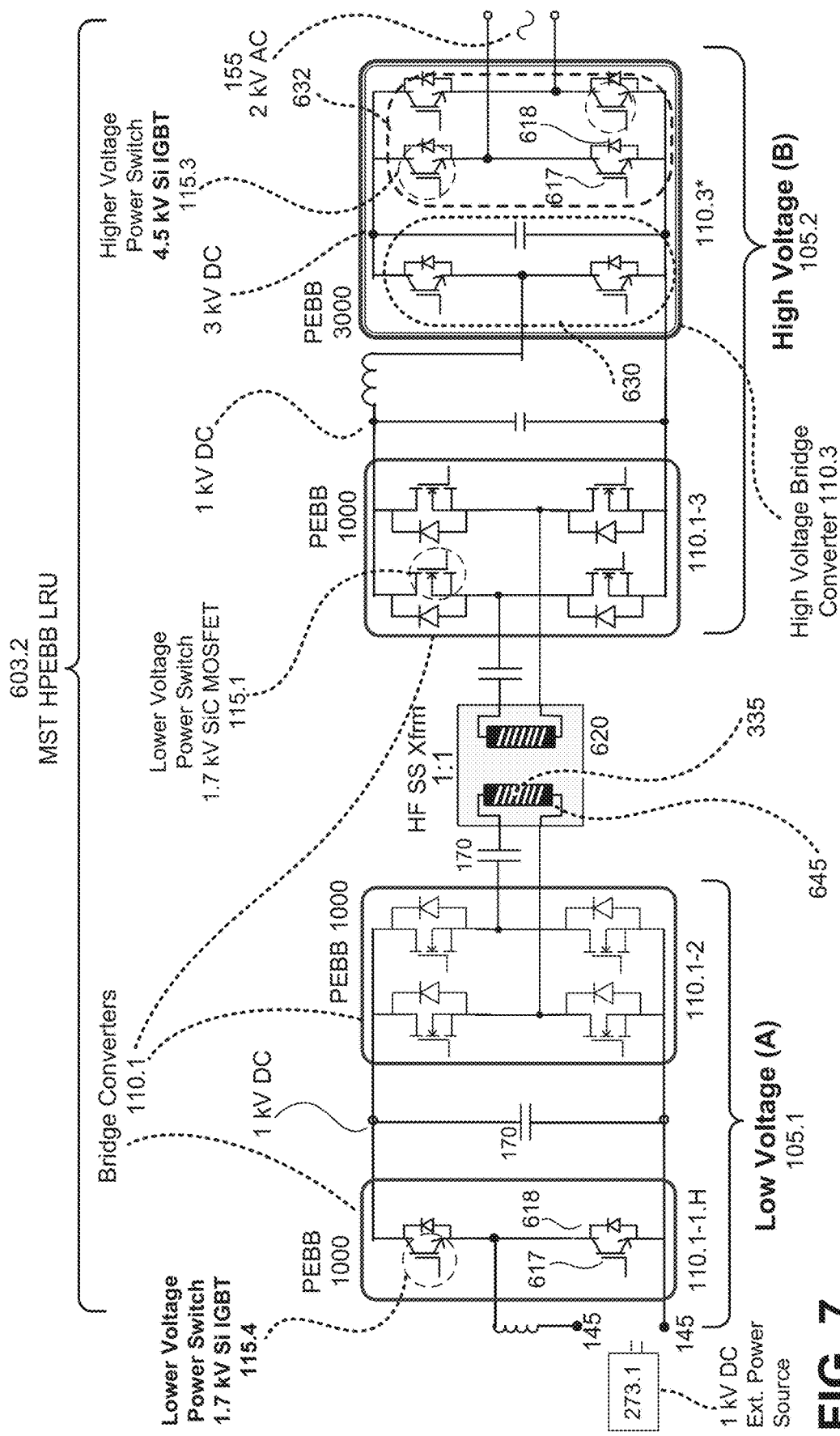

FIG. 7 illustrates an exemplary multi-switch types hybrid power electronics building block line replacement unit (MST HPEBB LRU) according to one or more embodiments of the present system and method.

Figure 8:
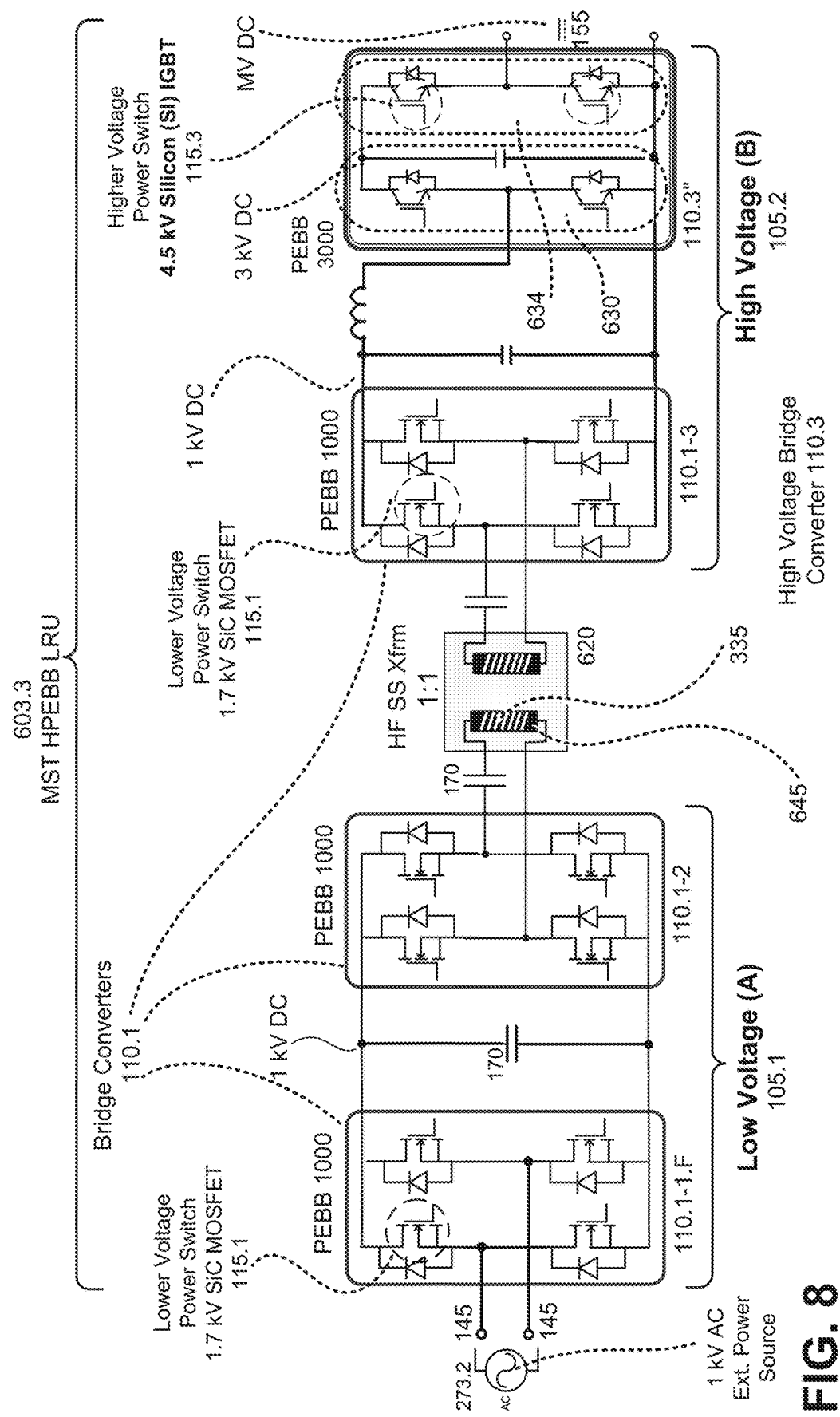

FIG. 8 illustrates an exemplary multi-switch types hybrid power electronics building block line replacement unit (MST HPEBB LRU) according to one or more embodiments of the present system and method.

Figure 9:
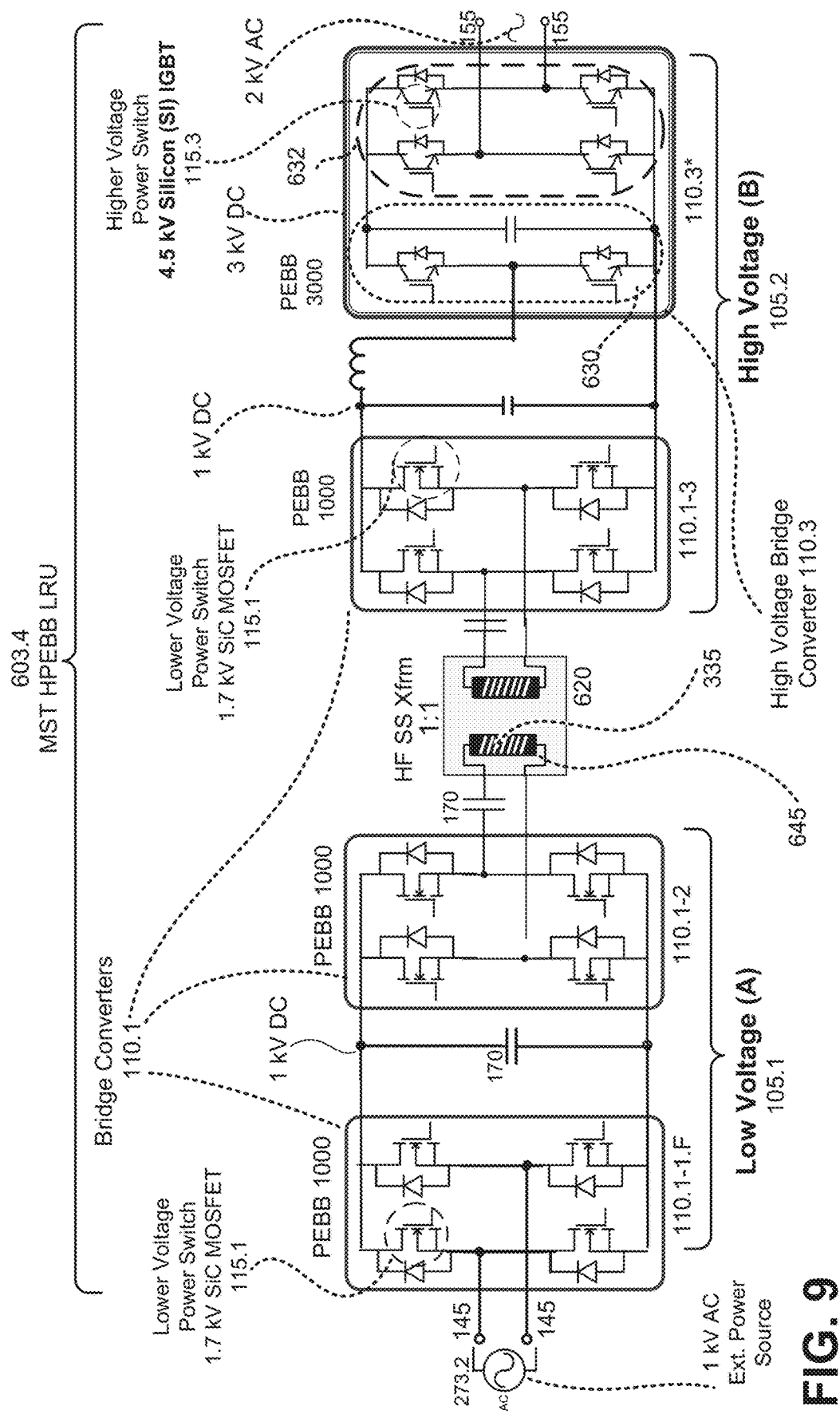

FIG. 9 illustrates an exemplary multi-switch types hybrid power electronics building block line replacement unit (MST HPEBB LRU) according to one or more embodiments of the present system and method.

Figure 10:
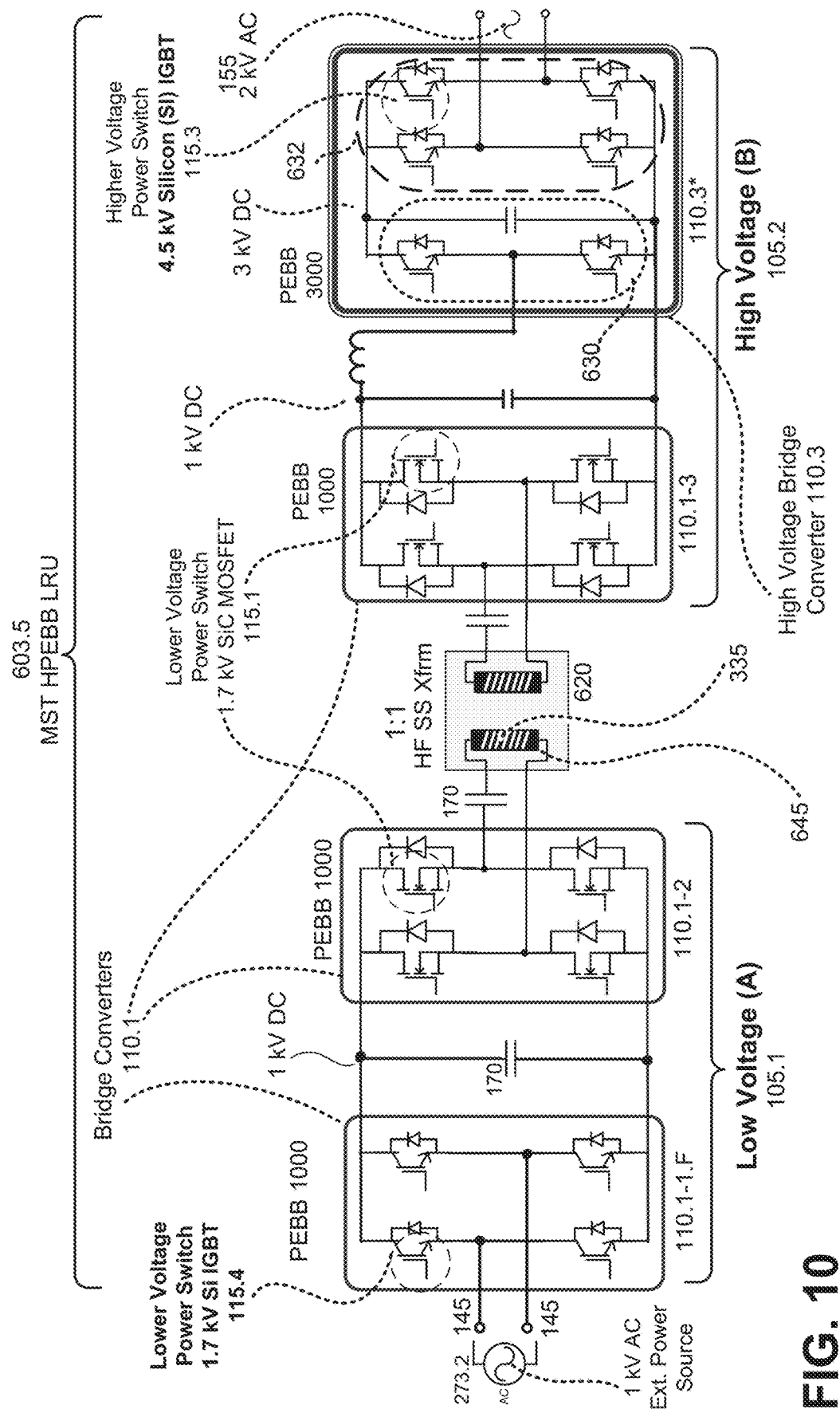

FIG. 10 illustrates an exemplary multi-switch types hybrid power electronics building block line replacement unit (MST HPEBB LRU) according to one or more embodiments of the present system and method.

Figure 11:
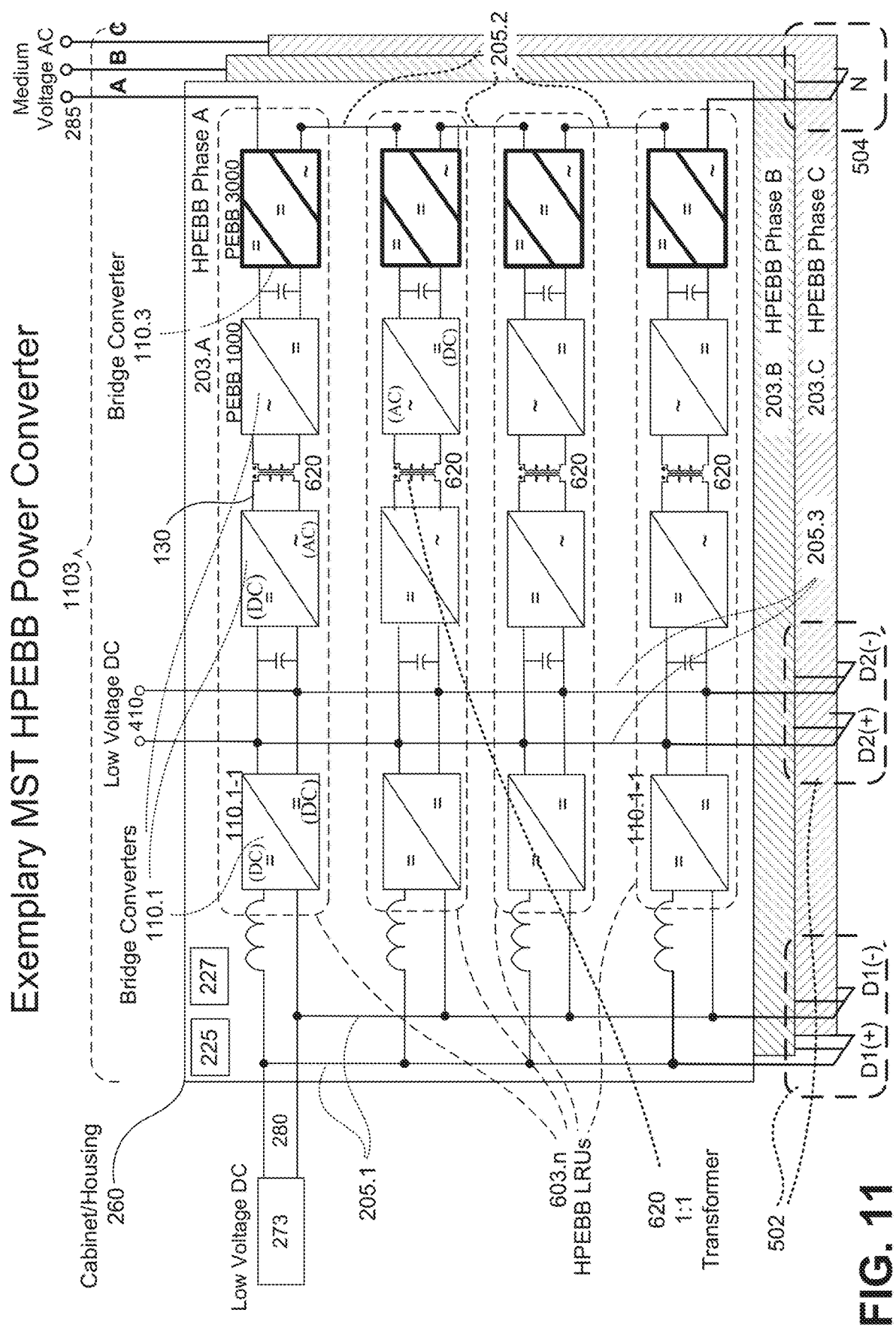

FIG. 11 illustrates an exemplary power converter which includes multiple multi-switch type hybrid power electronics building block line replacement units (MST HPEBB LRUs) according to one or more embodiments of the present system and method.

Regarding text in the figures: Any text in the figures is provided for convenience as an aid to understanding, to remind the reader of at least one possible embodiment of an element. Such text should not be construed a limiting, and different elements may be known or understood by additional or alternative labels, nomenclature, or alternative embodiments, as described within the written disclosure. Specific functional or operational values shown in the figures (for example, voltage values or power values) should be construed as exemplary only and not limiting.

VI. DETAILED DESCRIPTION OF EMBODIMENTS OF THE INVENTION

While the present invention is described herein with illustrative embodiments for particular applications, it should be understood that the invention is not limited thereto.

The following detailed description is merely exemplary in nature and is not intended to limit the system, configurations, and methods taught, nor to limit the elements or steps of the system, configurations, and methods taught, nor to limit the applications of the present systems, methods, and configurations as disclosed herein. Further, there is no intention for the scope to be bound or limited to or by any theory presented in the preceding background or summary, nor in the following detailed description. Those skilled in the art with access to the teachings provided herein will recognize additional modifications, applications, and embodiments within the scope thereof and additional fields in which the invention would be of significant utility.

Throughout the application, description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of power systems. However, it will be understood by one of skilled in the art, that in some specific instances, an embodiment can alternatively be described using the language "consisting essentially of" or "consisting of."

For purposes of better understanding the present teachings and in no way limiting the scope of the teachings, it will be clear to one of skilled in the art that the use of the singular includes the plural unless specifically stated otherwise. Therefore, the terms "a," "an" and "at least one" are used interchangeably in this application.

Headings used in this detailed description are present only to assist in making this document readable and easy to navigate, and should not be construed as defining or limiting.

The system and method is not limited to the embodiments described below, which are exemplary only. Rather, the full scope of the system and method is recited in the claims which follow. It will be further understood that the appended claims are themselves disclosure, and the full scope of the system and method may include elements which are recited in the claims only.

Terminology

Power resource: In this document, the term "power resource" refers generally to any electrical system which is either a source of electric power (including for example and without limitation a battery, an ultracapacitor, other forms of energy storage module, a multi-function energy storage module (MFESM) 273 (see FIG. 2), an electric generator, solar power panels, an electric power grid); or as a load for electric power (including for example and without limitation lasers, sensors, electric lights, electric motors, heating and cooling systems, radar, sonar, medical equipment, compressors, pumps, digital systems, communication systems, and other systems requiring electric power for operations).

The present system and method pertains to power converters 203 and structural building blocks (PEBBs) of the power converters 203 such as the hybrid PEBB LRUs 103; the system described herein are generally configured to accept a power source at one end and a load at the other end; or more generally, to be connected to a power resource at either end. In some embodiments below, power resources may be connected at other power ports configured midway along the internal power buses of the power converters 203.

For purposes of exposition and teaching below, as well as in the appended claims, and except as may be noted otherwise: (i) the systems disclosed herein as power converters 203 and HPEBB LRUs 103 are to be construed as functional hardware units which are separate from and are distinguished from the (ii) power resources (sources or loads) which provide electric power or serve as electric loads for the power converters/HPEBBs 203/103.

Power Converters and PEBBs: A Power Electronic Building Block ("PEBB") is a structural and functional element of a power converter, and may be any power processor that converts any input electrical power to the desired voltage, current, and frequency output. For maritime applications, a power converter typically employs multiple PEBB Least/Line Replaceable Units ("LRU").

"Buck" and "Boost": In this document, the term "buck converter" refers to an electrical converter which accepts a higher input voltage B and reduces it, or steps it down, to a lower voltage A. "Bucking" as used herein refers to the act or process of stepping down the voltage from B to A.

In this document, the term "boost converter" refers to an electrical converter which accepts a lower input voltage A and increases it, or steps it up, to a higher voltage B. "Boosting" as used herein refers to the act or process of stepping up the voltage from A to B.

Exemplary Systems

As noted above, a typical PEBB 1000 LRU used in legacy power converter technology is rated at 85 kW to 125 kW in power, with voltages ranging from 680 V dc-1 k V dc or 480 V ac-707 Vac. For one megawatt (or less) and 12 kV (or below) power applications, a power converter may be designed using twelve (12) legacy PEBB 1000 LRUs with paralleled or cascaded connections on each side of the PEBB LRU.

For higher medium voltage power converters (greater than 12 kV, for example, Navy or marine 13.8 k V ac ship power platforms), the numbers of legacy PEBB 1000 LRUs needed to meet three phase AC voltage requirement is tripled to thirty-six (36), with 12 LRUs per phase. For the same power rated LRUs, the PEBB 1000 LRUs, the use of thirty-six (36) PEBB 1000 LRUs increases the full power converter rating to 3 MW. Thus, for 1 MW power applications, combining 36 PEBB 1000 LRUs would result in a power converter which is over rated or oversized. In this legacy example case, the number of LRUs needed for the converter is determined/limited by the voltage capability of the legacy PEBB 1000 LRUs, or it is voltage limited.

As discussed below, the present system and method with HPEBB LRUs mitigates this limitation with a reduced weight and reduced size HPEBB-based power converter.

Exemplary HPEBB

In this document a PEBB LRU according to the present system may be referred to as a "Hybrid PEBB LRU" 103; or equivalently as a "PEBB X000 LRU" where X can be replaced/substituted with 2, 3, or 6 and "X000" represents a voltage which is greater than 1000 volts. In some exemplary embodiments X000 may for example be six thousand (6000) volts, but other voltages voltages (including for example and without limitation 2000 or 3000 volts) may be envisioned as well. The HPEBB 103 is a hybrid of lower voltage components and higher voltage power components. For further convenience and brevity, exemplary embodiments may also be referred to herein simply as a "Hybrid PEBB" or an "HPEBB" 103.

Embodiments of the present system include an HPEBB 103, and elements of an HPEBB 103, which can be employed in combination to construct a power converter 203 which may, for example, be a 1 kV DC to 13.8 kV AC PEBB. In various embodiments, an HPEBB 103 according to the present system and method requires fewer HPEBB LRUs 103 than the number of legacy PEBB 1000 LRUs which would be required in a legacy system, thereby reducing the total volume and weight of the power converter, and increasing the power density and specific power of the converter.

Figure 1:
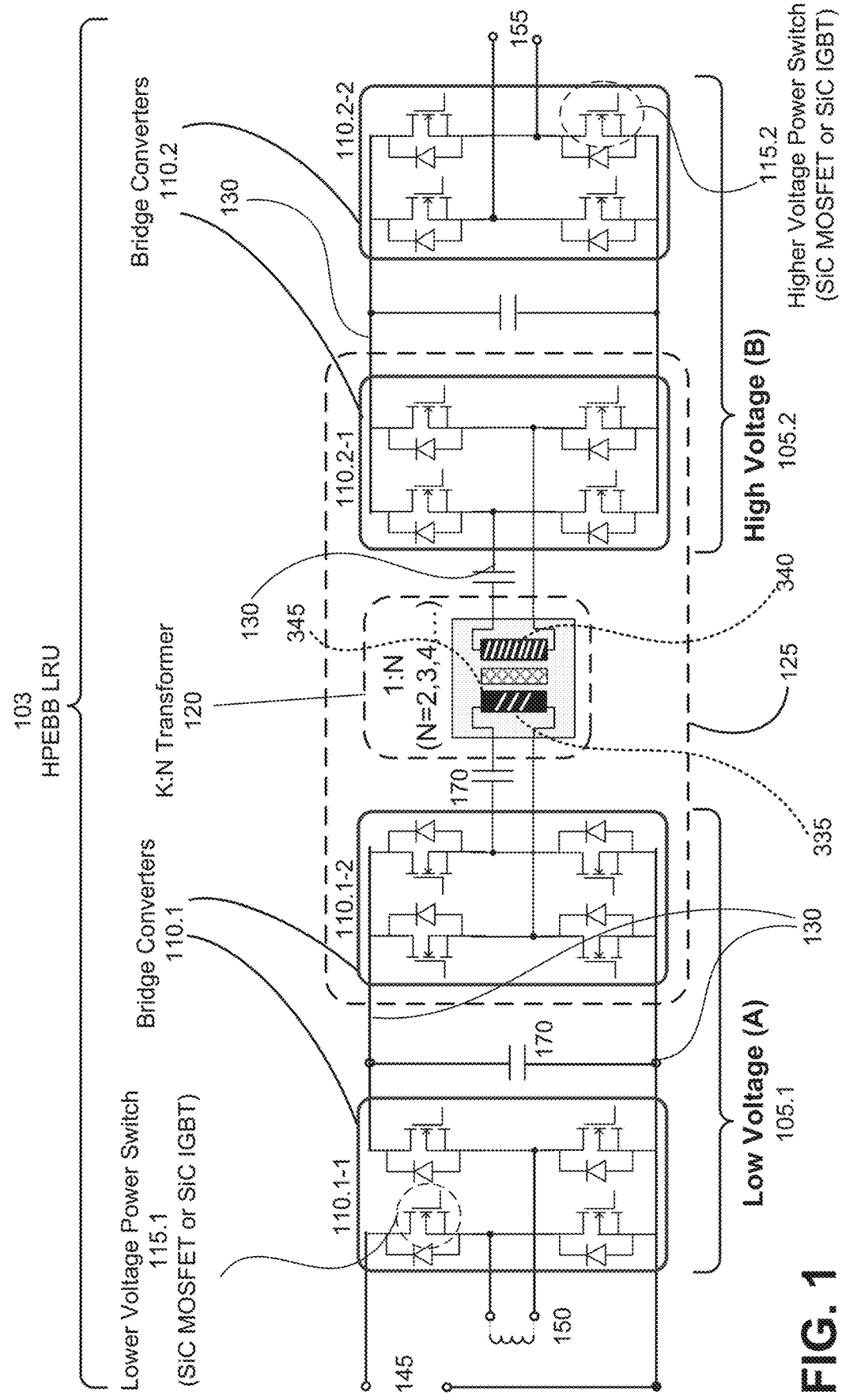
FIG. 1 illustrates an exemplary hybrid power electronics building block line replacement unit (HPEBB LRU) according to one or more embodiments of the present system and method as presented in the parent '0624 application.

FIG. 1 illustrates an exemplary HPEBB 103 according to the present system and method. In order to reduce the number of LRUs needed for the 1 kVdc-13.8 kVac PEBB converter, the present system introduces a hybrid PEBB LRU 103 for use in power converters, and which is built on mixed lower voltage power devices (105.1, 110.1, 115.1) and high voltage power devices (105.2, 110.2, 115.2).

Bridge Converters and Power Switches: The exemplary HPEBB 103 may include lower-voltage bridge converters 110.1 with lower-voltage switching devices 115.1, and also higher-voltage bridge converters 110.2 and higher-voltage power switches 115.2. The individual bridge converters 110 are also labelled, from left-to-right, as converters 110.1-1, 110.1-2, 110.2-1, and 110.2-2, with converters 110.1-1 being the left-most low voltage converter and 110.2.-2 being the right-most high-voltage converter. The power flow through the device is generally from 110.1-1 to 110.2-2, though in some embodiments the direction of power flow may be reversed.

In general, the lower voltages may be referred to as A volts and the higher voltages as B volts. In one exemplary embodiment, A=1.7 kV and may be implemented via 1.7 kV Silicon Carbide (SiC) switches 115.1, while B=10 kV and may be implemented via 10 kV SiC switches 115.2. The present system and method is designed, in part, to benefit from the higher power switches 115.2 which are in development or just emerging at the time of the present application.

In one embodiment of the present system and method, a power switch 115 is implemented as a MOSFET (metal-oxide semiconductor field effect transistor) in parallel with a diode, is illustrated in FIG. 1. In an alternative embodiment, a power switch 115 is implemented as in IGBT (insulated gate bipolar transistor) in parallel with a diode, as illustrated in FIG. 1. Persons skilled in the relevant arts will appreciate that a power switch 115 may be implemented as other combinations of one or more power transistors and other components, such as GaN (Gallium Nitride) wide band gap devices, JFET, IGCT (integrated gate-commutated thyristor), and diodes, within the scope of the present system and method.

In various different embodiments of the present system, any one bridge converter 110 may be designed and configured to convert alternative current (AC) power to AC power (~/~); alternating current (AC) power to direct current (DC) power (~/=); DC power to AC power (=/~); or DC power to DC power (=/=). A single HPEBB 103 may employ just one type of bridge converter (for example, AC-to-AC (~/~), or just DC-to-DC (=/=)); or may employ multiple types of bridge converters (such as AC-to-DC (~/=) and DC-to-AC (~/=), or other combinations).

In the exemplary embodiment of FIG. 1, the lower voltage elements 105.1 are configured for voltages of 1000 V, while the higher voltage elements 105.2 are configured for voltages of 6000 V. In general, a lower voltage A (such as 1000 V or 2000 V) and a higher voltage B (such as 3000 V or 6000 V or higher voltages) are employed.

In the exemplary HPEBB LRU of FIG. 1, a total of four bridge converters 110 are employed. In alternative embodiments, a total of two, three, or more than four bridge converters 110 may be used.

In some embodiments, the components (such as power switches 115) within a bridge converter 110 are electrically coupled as shown FIG. 1, with both series and parallel connections. Persons skilled in the relevant arts will appreciate that a bridge converter 110 may be implemented with other connection topologies, within the scope of the present system and method. In some embodiments, a bridge converter 110 is implemented via discrete devices, such as discrete power switches 115. In an alternative embodiment, a bridge converter 110 may be implemented as an integrated module.

It will also be understood that in the art, the bridge converters 110 are sometimes referred to by other terminologies, including for example and without limitation: power stage, power bridge, H-bridge converters, and full bridge converters. (In some literature in the art, a bridge converter 110 may itself be referred to as a "power converter." In this document, the term "power converter" is generally reserved for a power converter 203 which contains multiple HPEBB LRUs 103.)

It will also be understood that (making partial reference to legacy PEBB LRU terminology), the low voltage components 105.1 may be referred to as PEBB 1000 elements; while the high voltage elements 105.2 may be referred to as PEBB 6000 elements on the high voltage (HV) side.

The exemplary embodiment of FIG. 1 also illustrates a 1:N (N=2, 3, . . . ) high frequency (HF) transformer 120 configured to link the lower voltage elements 105.1 and the high voltage elements 105.2. That is, exemplary HPEBB 103 couples the lower voltage elements 105.1 and the higher voltage elements 105.2 via a high frequency (HF) transformer 120 with a higher than unity (1:1) winding ratio such as K:N, such as for example and without limitation, a 1:3 ratio or a 1:6 ratio.

In some embodiments, the exemplary HPEBB 103 may have a same or similar architecture (that is, element-to-element electrical connectivity or element-to-element topology) as a legacy PEBB 1000 LRU, except the HPEBB LRU 103 uses 6 kV (or higher) rated switches 115.2, such as SiC MOSFETs or IGBTs, on the high power side 105.2.

FIG. 1 illustrates one exemplary configuration for electrical connection among the bridge converters 110 and high frequency transformer 120 of the HPEBB 103. At a first end is a power connection 145 for a first power resource (not shown, but see the MFESM (273) in FIG. 2 for an exemplary first power resource, in this case a power source) which may be connected to a first lower voltage bridge converter 110.1; which is then connected in series with a second lower voltage bridge converter 110.1; which in turn is connected in series with the K:N high frequency transformer 120, and then in further series with two high voltage bridge converters 110.2; with a terminating power connection 155.

Each of the H bridge converters (110) in direct series connection on either side of the resonant circuit or high frequency transformer 120 may also sometimes be referred to as a "resonant stage" (110). The series power connections between the H bridge converters (110), are implemented via internal electrical buses 130.

The terminating power connection 155 is configured for connection to a second power resource (not shown) which supports or demands a higher voltage than the first power resources. In some embodiments of the present system, power connection 145 may be exclusively for a power resource which provides input power (that is, a power source), with power connection 155 exclusively reserved for a power resource which receives output power (that is, a load). In an alternative embodiment, power connection 145 may be exclusively for output power, with power connection 155 exclusively for input power.

In an alternative embodiment, either of power connection 145 or power connection 155 may be used for power input, with the other connection then used for power output, depending on the application and possibly time-varying with the time of usage of the connected power resources.

A HPEBB LRU middle section 125 may be defined as including the K:N high frequency power transformer in combination with a low voltage bridge converter 110.1 and a high voltage bridge converter 110.2.

In some embodiments of the present system, an exemplary high power switching device 115.2 may consist of or may include 10 kV SiC MOSFETs which at the time of this application are under development by Cree (Cree, Inc., 4600 Silicon Drive, Durham, N.C., 27703). In alternative embodiments, high power switches 115.2 may be implemented via other high power switches known or in development, including but not limited to high power MOSFETs and/or high power IGBTs. The higher turn ratio (for example 1:3) of the HF transformer 120 provides a voltage boost, and makes the hybrid PEBB (1000/6000) no longer voltage limited for higher MV (>12 kV) applications.

In the exemplary embodiment of FIG. 1, the bridge converters 110.1 on the low voltage side 105.1 may use 1.7 kV SiC MOSFET/IGBT devices, while the bridge converters 110.2 on the high voltage side 105.2 may use 10 kV SiC MOSFET/IGBT devices. In an exemplary embodiment with the HF solid state transformer 120 having a winding/turn ratio of 1:3 (one (1) on the low voltage side, and three (3) on the high voltage side), then multiple such HPEBBs 103 can be configured for a space and energy-density efficient 1 kVdc-to-13.8 kVac power converter. (See FIG. 2 below.)

The exemplary HPEBB LRU 103 of FIG. 1 may then be understood, in some embodiments, as a PEBB LRU with: (i) a first end 105.1 which includes a low-voltage power stage for power transmission at a first lower voltage A, the first end having a low-voltage switch 115.1 and/or bridge converter 110.1 configured to carry the first voltage A; (ii) a second end which includes a high-voltage power stage 105.2 for power transmission at a second voltage B which is higher than A, and where the high-voltage second power stage 105.2 includes a high-voltage switch 115.2 and/or bridge converter 110.2 capable of carrying the second, higher voltage B; and (iii) a transformer 120 having a first winding which is electrically connected to the low-first power stage 105.1 and a second winding which is electrically connected to the high-power stage end 105.2, the first winding having an integer number of turns K and the second winding having an integer number of turns N, so that the turns ratio of the first winding to the second winding is K:N, where N is an integer value greater than the integer value of K.

Persons skilled in the relevant arts will appreciate the hybrid PEBB LRU 103 of FIG. 1 is exemplary only, and other configurations are possible, including but not limited to power switches 115 with other power ratings and voltage ratings, and high frequency transformers 120 with other winding ratios. The configuration shown is exemplary only and not limiting. Persons skilled in the relevant arts will appreciate that only some components are illustrated while other components may be required in actual implementation. Shown for example in FIG. 1 are some exemplary capacitors 170, but additional capacitors 170 may be employed, along with inductors, other switches, integrated circuits (ICs) for control, electrical and heat sensors, and other elements as well.

Legacy PEBB Power Converters vs. HPEBB Power Converters

Terminology: In this document, the terms "a power converter based on HPEBB LRU technology" 203, "an HPEBB-based power converter" 203, and "an HPEBB power converter" 203 are used as synonymous, equivalent terms.

Legacy vs. HPEBB: To support 1 kVdc-13.8 kV 1 MW power conversion while employing only legacy PEBB 1000 LRUs, a legacy power converter would require well over twelve (12) PEBB 1000 LRUs. In some known configurations, thirty-six (36) PEBB 1000 LRUs are required, twelve (12) for each phase.

Figure 2:
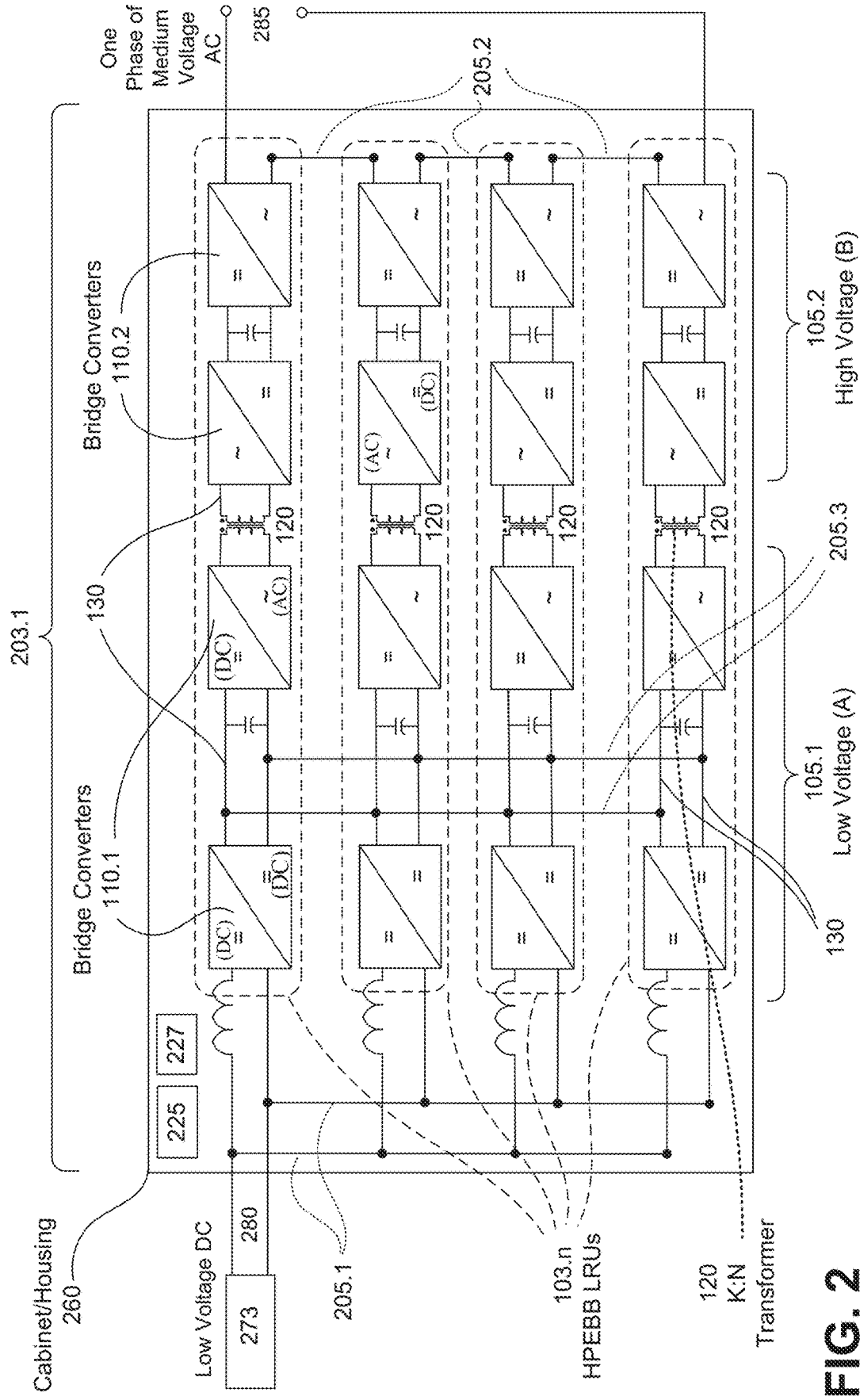
FIG. 2 illustrates an exemplary power converter which includes multiple hybrid power electronics building block list replacement unit (HPEBB LRU) according to one or more embodiments of the present system and method as presented in the parent '0624 application.

Exemplary HPEBB Power Converter: FIG. 2 is a schematic diagram of an exemplary HPEBB-based power converter 203.1 employing HPEBB LRUs 103 such as the exemplary HPEBB 103 of FIG. 1. As shown in FIG. 2, the total number of hybrid PEBB LRUs 103 (for an exemplary single phase power converter) has been maintained at four (4) per phase and twelve (12) for three (3) phases (not shown in FIG. 2), but with greater voltage and power output than a power converter based on PEBB 1000 LRUs.

Power converter volume and weight: The hybrid PEBB LRU converter 203.1 volume and weight may increase somewhat due to the use of PEBB 6000 components 110.2, 115.2 on the primary or high voltage side 105.2; and may further increase due to additional cooling requirements. However, due to the reduced requirement for the total number of HPEBB LRUs 103 (as compared with legacy power converters), in various embodiments the total volume and weight of the exemplary 1 kVdc-13.8 kV 1 MW hybrid PEBB power converter 203.1 will be significantly reduced (as compared with the weight/volume of the legacy PEBB 1000 LRU-based power converter with the same voltage/power capacity).

Correspondingly, in various embodiments the present system provides for an HPEBB power converter 203.1 with a power density and specific power which is significantly increased via the use of HPEBB LRUs 103 (as compared with the power density/specific power of a legacy PEBB 1000 LRU-based power converter with the same total power capacity).

As shown in FIG. 2, in an exemplary embodiment, an HPEBB power converter 203.1 may be configured with four (4) HPEBB LRUs 103.$n$, n=1 to 4. The vertical stacking of the HPEBB LRUs 103.$n$ shown in the figure is exemplary only and for convenience of illustration. In practical implementation, the HPEBB LRUs 103.$n$ may be vertically stacked, horizontally situated, arranged spatially in a 2×2 arrangement; other spatial relations may be envisioned as well.

In an embodiment of the present system and method, the multiple HPEBB LRUs 103 are electrically coupled as indicated in the figure, with parallel electrical connections 205.1 joining the first (low voltage) ends of all of the PEBB LRUs 103 and serial electrical connections 205.2 joining the second (high voltage) ends of all the PEBB LRUs. In an embodiment, parallel connections 205.3 may also be employed joining the interior electrical buses 130 of the HPEBB LRUs 103. In an alternative embodiment, parallel connections 205.3 may be omitted.

Alternating current (AC) and direct current (DC) conversion: Regarding the bridge converters 110 of the exemplary HPEBB LRUs 103.$n$, the internal details of their power switches 115 are not illustrated in FIG. 2 (see FIG. 1 instead). However, it will be noted that in embodiments of the present system and method, and as shown in the exemplary embodiment of FIG. 2, some of the bridge converters 110 may be configured for DC-to-DC (=/=) current conversion, or for DC-to-AC (=/~) conversion, or for AC-to-DC (~/=) conversion. While not shown in FIG. 2, in some embodiments, one or more AC-to-AC (~/~) bridge converters 110 may be employed as well. In different embodiments of the present system and method, the exact combinations of AC-to-AC, DC-to-DC, AC-to-DC, and DC-to-AC bridge converters 110 may be application specific for different power converters.

As shown in FIG. 2, the exemplary HPEBB power converter 203.1 may be connected to a power resource 273 via a first power port or connection 280 on the low voltage side 105.1. For example, and not by way of limitation, the power resource 273 may be a multi-function energy storage module (MFESM) 273 rated for between 680 kV to 1000 volts DC. The exemplary HPEBB power converter 203.1 may be also provide for a second power connection via a second power resource port or connection 285 on the high voltage side. A power resource (load or source, not shown in the figure) may be connected here as well. The second power port 285 may, in an embodiment, deliver a single phase of three phase medium voltage AC of 13.8 kVolts.

The exemplary HPEBB power converter 203.1 is typically contained in a cabinet or housing 260 which contains all the above elements, as well as others not shown in the figure but known in the art. The cabinet 260 may include, contain or have attached, for example and without limitation: various internal structural support elements (not shown), system buses, power buses, ports for connection with exterior elements and connection to exterior systems, vents for airflow, pipes or ducts for coolants associated with cooling system(s) 225, exterior status display(s), electronics for feedback and control systems 227 (including processors and memory), and other elements not necessarily shown in FIG. 2.

The cabinet or housing 260 may include the elements of one or more cooling systems 225, as discussed further below. While cooling system(s) 225 is illustrated in FIG. 2 as a single block or module, this is for purposes of illustration only and is not limiting. Elements of a cooling system 225 may have or be composed of different elements, which may be distributed throughout the interior of cabinet 260.

As will be apparent from FIG. 2, external power may flow into the first port 280, being distributed among multiple HPEBB LRUs 103.$n$; within each HPEBB LRU 103.$n$, power may directed into the low voltage bridge converters 110.1, through the high frequency transformers 120, and then further directed into the high voltage bridge converters 110.2. Output from the high voltage bridge converters 110.2 is combined at port 285 for transfer to a power load. In an alternative embodiment, power and electric current may flow from a source at port 285 to a load at port 280.

VII. COOLING

Persons skilled in the art will appreciate that heat dissipation is necessary for effective operations of electric systems. Legacy power converters based on HPEBB 1000 technology typically employ air-cooling (employing for example cooling fans, vents, and heat sinks).

As noted above, in various embodiments using the HPEBB LRUs 103, the present system provides for an HPEBB power converter 203.1 with a power density and specific power which is significantly increased (as compared with the power density/specific power of a legacy PEBB 1000 LRU-based power converters). The increased power density and specific power of the present HPEBB LRU 103 and HPEBB power converter 203 may generate more volumetric or gravimetric heat (or heat per unit volume or weight) and higher temperature than is generated by legacy PEBB 1000 LRU based power converters.

To dissipate the heat which may be generated via the present system and method, and in some embodiments of the present system and method, a liquid-based cooling system 225 may be employed, either in combination with air-based cooling or to substantially replace air based cooling.

In particular, the combination of higher voltages, multiple transformer windings, and the more compressed size of the HPEBB LRUs 103.*n* and the HPEBB power converter 203.1 as a whole may result in intense heat generation by the high frequency transformers 120. The heat generated from the HF transformers 120 during operation is comprised of the I2t loss (current-squared ($I^2$) time loss) in the primary and secondary coils (coils loss), and the heat/power loss in the magnetic core (core loss) of the high frequency transformers 120. In some embodiments, the present system and method introduces dedicated liquid based cooling for HF transformers 120.

Thus, in some embodiments, the present systems advances the air-cooled PEBB converter with a liquid-cooled thermal management solution 320 to further improve volumetric power density for especially space constrained pulse load application (for example, onboard a military or commercial ship).

The heat loss distribution among coils-loss and core-loss varies based on a specific design and materials used. To reduce volume and increase power density, embodiments of the present system and method employ a liquid-cooled HF transformer 120, with a liquid-cooled solution for the thermal management of the transformer coils and core.

FIG. 3A provides a schematic illustration of some elements of an exemplary high frequency transformer 120 with a liquid cooling system (LCS) 320.1 as may be employed in some embodiments of the present system and method. In an embodiment, LCS 320.1 may be an element of the overall cooling system 225 for exemplary HPEBB LRUs 103 and HPEBB power converters 203. In some embodiments, elements of the LCS 320.1 and the HF transformer 120 form a structurally integrated system, that is, with elements of the LCS 320.1 embedded within the structure of high frequency transformer 120.

In an embodiment, the HF transformer 120 includes two primary (high voltage/HV) coils 340, two secondary (low voltage/LV) coils 335, three magnetic (ferrous) cores 345, and electrical connections 350 (only one shown in the figure). The primary and second coils are not actually illustrated; rather, illustrated in the figure are solid coil components 340, 345, which may for example be made of resins, epoxies, ceramics, glass, or other non-conducting substances materials, with electrically conducting (typically metallic) coils embedded within. Heat generated by the electrically conducting coils is readily transferred into the surrounding epoxy, resin, or ceramic material of the core components 340, 345.

In the exemplary embodiment shown, three cold plates 360 (also referred to as "heat exchangers 360") are physically inserted or sandwiched between, and in substantial contact with, all of the coil components 340, 335 and the cores 345. In an embodiment, the cold plates are made of a non-ferrous (non-magnetic) metal. In an alternative embodiment, the cold plates 360 may be made of other non-ferrous, non-metallic materials which are suitable for conducting heat.

Running through each cold plate 360 are one or more liquid transport channels 367 (not illustrated in FIG. 3A, see FIG. 3B) suitable for conducting a coolant fluid such as deionized water, chill water or process water with or without petro-chemical additives, or other coolant liquids. One or more coolant tubes 365 (or "coolant pipes") conduct the liquid coolant into and out of the cold plates 360. Transport of the coolant fluid through the interior channel(s) 367 of the cold plates 360 conducts heat away from transformer 120.

Persons skilled in the art will appreciate that various additional conduct materials, such as thermal binding materials or glues, may be used to help bond or adhere the coils 335, 340 and core 345 into cold plates 360, and to maintain efficient and uniform heat transfer.

Persons skilled in the relevant arts will appreciate that a full or complete liquid cooling system for transformer 120 will include not only the elements of cooling system 320.1, but also various coolant pumps, heat exchangers, valves, temperature sensing devices, coolant reservoirs, and other elements not shown in FIG. 3A. Such additional elements will, in some embodiments, be parts of a hybrid PEBB LRU 103 and/or a hybrid PEBB power converter 203.1.

Persons skilled in the relevant arts will also appreciate that the exact configuration and arrangement of the transformer with cooling system 320.1 is exemplary only, and other arrangements may be envisioned. These may include, for example and without limitation: more or fewer cooling plates 360; one or more alternative or additional cold plates 360 bonded to exterior surface(s) of the magnetic cores 345; other alternative geometries; more or fewer coolant tubes 365; and other variations within the scope of the appended claims.

FIG. 3B provides a schematic illustration of some elements of an exemplary high frequency transformer 120 with a liquid cooling system (LCS) 320.2 as may be employed in some embodiments of the present system and method. In FIG. 3B, the transformer with liquid cooling system (LCS) 320.2 is shown in cross-sectional view, and with some elements omitted as compared to the embodiment 320.1 of FIG. 3A. In transformer with LCS 320.2, only a single primary coil 340 is employed, which is sandwiched between two secondary coils 335. Two cold plates 360 are employed on the outer surfaces of secondary coils 335. The cold plates 360 are in thermal contact with the magnetic core 345 as well. Coolant pipes 360 with interior channels 367 running through the heat exchangers 360 are shown as well.

In an alternative embodiment (not illustrated), cold plates 360 may be placed in thermal contact with the exterior of magnetic core (345) (either in addition to, or as an alternative to, the cold plates 360 which are sandwiched between the core and heat exchangers as shown in FIG. 3B).

Transformer immersed in oil: In an alternative embodiment (not illustrated in the figures), and as either an alternative to or an addition to embodiments discussed above, the entire HF transformer 120 may be structurally fixed and/or suspended within a substantially sealed container. The entire container may be filled with a non-electrically conducting, but heat-conducting fluid, such as a mineral oil ("the oil"), thereby immersing the transformer 120 in the oil. In various embodiments, the container is configured with suitable liquid-sealed ports allowing for pipes and electrical connections, without allowing the oil coolant to leak. Via the oil or other heat-conducting fluid, heat is transported from the transformer 120 to the sealed container. Cooling elements bonded to the sealed container (such as cold plates 360) or in substantial proximity to the sealed container may then further convey heat from the sealed transformer assembly.

It will be noted that the cooling systems (320) for transformers (120) described above are optional; and further that such cooling systems (320) may be implemented and used in contexts other than with an HPEBB LRU (103).

VIII. ADDITIONAL POWER-BUS LINK OPTIONS

Non-Isolated Second DC Power Port/Bus: FIG. 4A schematically illustrates an exemplary power converter 203.2 which includes multiple hybrid power electronics building block line replacement unit (HPEBB LRU) according to the present system and method. The power converter 203.2 may employ elements and arrangements of elements which are the same, or substantially similar, to those described above in relation to exemplary power converter 203.1 described above (see FIG. 2). Repeated elements will not be described here.

In an exemplary embodiment power converter 203.2 provides for a reconfigurable buck and boost active energy storage front-end power converter/conversion stage (power stage) by enabling a regulated DC bus/link option 410 at the non-energy-storage end of the reconfigurable active front end (AFE) 404. (The non-energy-storage end of the AFE is the ends of the bridge converters 110.1 which are not connected to input port 280.) In an embodiment, and as shown in the figure, this additional functionality is accomplished by connecting in parallel the non-energy storage end of the AFE power stage 404 via power connections 412; and by controlling the AFE power stage with power regulation algorithms implemented via software running on a suitable processor (not shown in the figure), without requiring the addition of further power electronics hardware. In some embodiments, this provides a second regulated DC bus/port 410 (in addition to first power port or connection 280), without needing additional converter(s) 110.1, thereby saving costs, reducing volume and improving overall system power density.

Second DC bus/port 410 may be connected with an energy/power source or load that requires a regulated DC bus/link. One practical and emerging example is for both military (e.g., Naval large surface combatants) and commercial (e.g., drill ships) marine power system applications.

The exemplary power converter 203.2 of FIG. 4A is configured for three-phase power operations, but a similar non-isolated regulated LVDC link 410 may also be provided for embodiments which are configured as a single phase power converter.

Galvanically-Isolated Second DC Power Port/Bus: FIG. 4B schematically illustrates an exemplary power converter 203.3 which includes multiple hybrid power electronics building block line replacement unit (HPEBB LRU) according to the present system and method. The power converter 203.3 may employ elements and arrangements of elements which are the same, or substantially similar, to those described above in relation to exemplary power converter 203.1 described above (see FIG. 2). Repeated elements will not be described here.

In an exemplary embodiment, power converter 203.3 provides for a reconfigurable buck and boost active energy storage back-end power converter/conversion stage (power stage) by enabling a regulated, galvanically-isolated DC bus/link option 420 at the regulated back end (BE) 407 of power converter 203.3.

In an embodiment, and as shown in the figure, this additional DC bus/link 420 may be enabled by connecting in parallel the internal electrical buses 130 of back end of power stage 407 via power connections 414; and by controlling the BE power stage 407 with power regulation algorithms implemented via software running on a suitable processor (not shown in the figure), without requiring the addition of further power electronics hardware.

The exemplary power converter 203.3 of FIG. 4B is configured for three-phase power operations, but a similar galvanic-isolated regulated MVDC link 420 may also be provided for in a single phase power converter.

Galvanic isolation: Galvanic isolation for outputs enables having power outputs that are "floating" with respect to the input (meaning there are no direct electrical connections or no electric current conducting path between input and output). The benefits of galvanic isolation include, for example and without limitation: that ground loops can be broken to reduce noise in electrical systems; the output polarity can be freely chosen; and the current-isolation barrier (formed by the transformer 120) can form an important safety element to prevent electric shock and to reduce other hazards caused by electrical fault conditions (such as short circuits).

Since power port 420, which may be employed as an output port, is galvanically-isolated from power resource port 280 (which may be used for power input), the choice of the 'zero' reference voltage for the input or output side is also arbitrary. The electrical connections 414 enabling the regulated, galvanically-isolated DC bus/link 420 of exemplary power converter 203.3 are similar to the ones of exemplary power converter 203.2 (FIG. 4A), except that the regulated DC bus/link 420 is now on the opposite side of the solid-state high frequency transformer 130. Therefore, the regulated DC link/bus 420 is galvanically isolated from the non-regulated DC bus/link 410 (not shown in FIG. 4B, see FIG. 4A) and/or from the energy storage (end) 273/280.

In some embodiments, this provides a second regulated DC bus/port 420 (in addition to first power port or connection 280), without needing additional converter(s) 110.1, thereby saving costs, reducing volume and improving overall system power density.

It will be noted that the additional HPEBB power ports (410, 420) described above are optional for the HPEBB LRUs (103) described herein; and further that such additional ports (410, 420) may be implemented and used in legacy PEBB LRUs as well.

IX. THREE-PHASE POWER CONVERSION

In some embodiments of the present system and method, such as exemplary power converter 203.2 and exemplary power converter 203.3, and HPEBB-based power converter may deliver three-phase electric current.

FIG. 5 provides a schematic illustration of another embodiment of a HPEBB power converter 203.5 configured to deliver megawatt scale three-phase power, converting direct current to AC current power. Here, exemplary HPEBB power converter 203.5 employs three phase converters, 203.A, 203.B, 203.C (or "203.P", in brief), each of which is a power converter 203 for a single phase A, B, or C of the power system. Each phase converter 203.P includes four (4)

PEBB least replaceable units (LRUs) 103.*n*. The four LRUs 103.*n* within each phase (A, B, C) are connected 205.1, 205.3 in parallel on both sides of the AFE power stage, enabling dual (un-regulated and regulated) DC buses/links. The four LRUs 103.*n* are connected 285 in series 205.2 on the AC port/side of the LRUs 103. Both un-regulated and regulated LVDC (on both sides of the AFE power stage) of the three phases (A, B, and C) are connected 502 in parallel. The neutral 504 on the MVAC side of the three phases are tied together. System controls will manage bi-directional power and energy flows and provide regulated LVDC.

In various exemplary embodiments, the present system and method may entail the use of or integration of control systems 227 for regulation of switches, capacitors, cooling systems, and other factors requiring real-time control. Such control systems 227 may entail the use of microprocessors, digital input/output elements, memory (such a random access memory (RAM) and various forms of non-volatile memory), display systems, audio input and/or audio signalling systems, and/or analogue control elements known in the art or to be developed. Such control systems 227 may employ suitable-coded software, stored in memory, to control various aspects of system operations.

Above, exemplary embodiments of the present system have been presented with exemplary components of various power, current, and/or voltage ratings, for example 1.7 kV switches and 10 kV switches. Other power/current/voltage ratings may be employed within the scope of the appended claims. For example, in some embodiments, 3.3 kV SiC MOSFETS or IGBTs may be employed, including possible use of super junction SiC— high efficiency, low loss technologies. In alternative embodiments, two (2) or more 1.7 kV power switches or devices/module may be employed in series or cascaded within the bridge converters.

Above, exemplary embodiments of the present system have been presented with exemplary K:N power transformers with winding ratios (also known as "turn ratios" of 1:3 vs. 1:6. In some embodiments, other ratios may be employed, such as 1:2, 1:4, 1:5, and other turn ratios may be implemented as well depending on the relative voltages (A compared to B) of the power switches.

X. FURTHER EMBODIMENTS AND APPLICATIONS OF THE HYBRID PEBB

For Maritime purposes, including Naval applications such as Naval Power System and Energy System (NPES) technologies, PEBB bridge converters and power converters are being developed as part of a multi-function energy storage module (MFESM) effort. The legacy development efforts have focused on 1 MW PEBB per module/converter. Potential initial applications are targeted for energy magazine (EM) on ship platforms with 450 Vac and 4160 Vac power distribution systems. PEBB for medium voltage direct current (MVDC) system is also being developed at 6 kV DC link voltage, which is also scalable and applicable for 12 kV DC system.

In legacy systems, the modular and scalable PEBB 1000 LRU using 1.7 kV SiC switches can be used in various ship platforms (450 Vac, 4160 Vac, 6 kVdc, and 12 kVdc). The PEBB 1000 LRU is designed/rated at 85 kW to 125 kW at 680V to 1 kV voltage. For 1 MW PEBB converter for ship platforms of 450 Vac, 4160 Vac, 6 kVdc, and 12 kVdc, PEBB 1000 is power limited. That is, multiple PEBB 1000 LRUs are needed stacked up in series or in parallel to make up the 1 MW rated power. The stacked-up PEBB converter has extra or sufficient margin for achieving the voltages required.

One additional common power distribution system in USN (US Navy) fleet is the 13.8 kVac distribution, such as the one used on aircraft carriers. 13.8 kVac power distribution may also be the first choice for USN future large surface combatants (LSC). Looking forward to future development, for 13.8 kV (or higher) ship platforms, the PEBB 1000 LRU becomes voltage limited; that is, the number of PEBB 1000s needed to stack-up to the required voltage will exceed the 1 MW power rating. The result is oversized PEBB converter for 1 MW applications. Such oversized PEBB 1000-based converter will certainly present challenges and disadvantages over other power converters in terms of power density and specific power.

HPEBB of the Parent PCT '0624 Application

As a result, higher power density and specific power are desired/required and critical for future ship platform applications. The hybrid PEBB power converter utilizing/leveraging both PEBB 1000 and PEBB 6000 with a higher (than 1:1) or multiple turn ratio of high frequency (HF) transformer taught in the present application is designed for 13.8 kV AC or greater than (>) 12 kV DC applications. With the exemplary embodiments disclosed herein, and other embodiments within the scope of the appended claims, the number of hybrid PEBB LRUs needed for a 1 MW and 13.8 kVac system/ship platform may be twelve (12) such modules, which is the same number as the PEBB 1000 based power converter for all other ship platforms (450 Vac, 4160 Vac, 6 kVdc, and 12 kVdc).

As a result, the system and embodiments taught herein, as well as other embodiments within the scope of the appended claims, further enhances and standardizes the modularity and scalability of PEBB-based power converters in terms of same/identical converter architectures. In some embodiments of the present system and method, 10 kV SiC power switches and bridge converters may be employed without the power converter being oversized or overdesigned in terms of excess power capability. However, in alternative embodiments for power converter level targeted especially for 13.8 kVac applications with higher rated power requirements up to 3 MW, and HPEBB-based power converter will have approximately 30% less volume or approximately 43% better (1.43×) power density.

The hybrid PEBB will not only serve/meet the needs for 13.8 kVac ship board power systems, but also provide a more power dense converter option/solution for 3 MW EM and NPES applications. Both 1 MW and 3 MW hybrid PEBB converters based on PEBB 1000/6000 and PEBB 2000/6000 respectively, are relevant to NPES and will contribute and be better-suited for different phases of NPES implementations.

XI. MULTI-SWITCH TYPE HPEBB LRU

Switch Types: As is known in the art, the lowest-level or most fundamental electrical switching devices employed in power electronic switches are generally single electrical components known as "transistors". (Diode devices may also be employed, and in some technical contexts a diode may be construed to be a kind of simple switch as well. For purposes of this document, the term "switch", when employed in relation to a fundamental electronic element, generally refers to a transistor unless indicated otherwise.)

Fundamental switching device types currently known in the art include bipolar junction transistors (BJTs) and field effect transistors (FETs), with FETs generally being favoured for high power electronic systems. FETs in turn, may have different structures and compositions, and so are further categorized among different devices types such as metal oxide semiconductor field effect transistors (MOS-FETs) which may employ a variety of different materials. Other types of fundamental switching components may be hybrid components, such as insulated gate bipolar transistors (IGBTs), which employ in a single, lowest-level electrical component, some elements of both BJTs and FETs.

(It will be noted that, in the art, the term "switch" has various overlapping uses. For example, "switch" is often employed as well to refer to multi-component switching modules or complex switching devices which may employ two or more fundamental switching devices (that is, two or more transistors) which are electrically coupled. In the literature, then, the term "switch" may refer to either of a single fundamental switching device (such a single BJT or single FET, both discussed further below); or to a more complex, multi-component modules or system. In many cases, the meaning of the term "switch" is apparent from context.)

Switching Component Types, Material Composition, and Operational Characteristics: Fundamental switching components (BJTs, IGBTs, and MOSFETs) may be still further characterized or categorized as different types depending on the electrical materials employed in their composition. For example, some switching components may be considered to be strictly silicon (SI)-based devices, which others may be categorized as Silicon-Carbon (SiC) based devices. As in known in the art, otherwise similar devices with different material compositions may have distinctly different properties in terms of, for example, maximum voltage they can carry, maximum currents they can carry, maximum switching speeds and/or maximum frequencies, reliability, stability, heat tolerance, manufacturing costs, and other performance factors.

Multiple-Switch Types: In embodiments described above in this document, the HPEBB LRU employed Silicon Carbide (SiC) power switches (SiC MOSFETs) 115.1, 115.2 for both high power and lower power switching elements on both the low power side 105.1 and high power side 105.2 of the LRUs. As described above in this document, and at the time of this filing high-power, SiC MOSFET components are currently in limited supply, expensive, and may be unreliable. Therefore, the present system and method replaces any high voltage (greater than 1.7 kV) SiC MOSFET components with available, reliable Silicon (Si) IGBTs.

As such, the HPEBB LRUs disclosed below in this document include both SiC MOSFET switches and Silicon IGBT switches. Such HPEBB LRUs are referred to herein as multiple-switch types hybrid power electronic building block line replacement units 603, or in brief as MST HPEBB LRUs 603. (For brevity, "multi-switch type" is often employed in place of "multiple switch types".)

The discussion below presents five different, exemplary MST HPEBB LRUs 603 in FIGS. 6 through 10. Persons skilled in the relevant arts will appreciate that the present system and method is not limited to these embodiments, and that other MST HEPBB LRUs 603 may be implemented within the scope of the appended claims.

It will be noted that in FIGS. 6 through 10, the bridge converters 110.3 which are newly configured (different) from the corresponding bridge converters 110.1, 110.2 of exemplary HPEBB LRU 103 of FIG. 1 above, are highlighted with a thick, darker-tone, doubled border. In FIG. 11, such adaptable bridge converters 110.3 are highlighted with an extra-thick border and further annotated with =/=/~ (DC, DC, AC) symbols.

General Multi-Device Type Design Considerations: Various design considerations may be weighted in selecting which types of fundamental switching devices are selected for use in an MST HPEBB LRU 115. As a general consideration, PEBB LRUs have multiple bridge converters 110, with some bridge converters configured for carrying a first lower voltage A, and other bridge converters 110 configured for carrying a second, higher voltage B. Different bridge converters 110 within any PEBB LRU may also be configured only for DC currents, AC currents, or both AC and DC currents. Also pertinent are the ultimate designated input voltages and currents, and the maximum output voltages and currents.

In any multi-switch types design according to the present system and method, specific modules or submodules 110, 630, 632, 634 within the PEBB LRU are assessed with respect to any or all of the voltages or currents they are expected to carry, whether they will handle AC, DC, or both, and the other sources, loads, and/or internal modules with which they are to be coupled. In an embodiment of the present system or method, each module or submodule 110, 630, 632, 634 will be implemented with one device type 115.x among several different device types 115.1, 115.2, . . . , 115.$n_{DT}$ which may be employed in an MST HPEBB LRU 603.

In an embodiment of the present system and method, the specific device type 115.x selected for a given module or submodule 110, 630, 632, 634 will be selected based on selecting a fundamental device type 115.x which both: (i) meets the performance requirements of the particular module or submodule, and (ii) optimizes, for at least that module/submodule, factors such as maximal power density, minimum switch device size, minimum switch device weight, reduced heat generated by each switch device, switch device cost, and any kinds of circuit complexity entailed by the fundamental device type. (For example, different types of fundamental device types may require, for each fundamental switch, different types or different circuit connections for associated resistors, capacitors, or inductors.)

Specific design choices, including the number of different fundamental switch types 115, and their specific utilization within the MST HPEBB LRU 603, will vary depending on specific operational objectives for the MST HPEBB LRU 603. In some embodiments, the number ($n_{DT}$) of different fundamental device types 115 employed is limited to two (2) (for example, and without limitation, possibly low-power SiC MOSFETS 115.1 and high-power Si IGBTs 115.3). In alternative embodiments, the number ($n_{DT}$) of different fundamental devices types 115 employed for an MST HPEBB LRU 603 may be three (3) or more different fundamental device types 115. It will be noted that while embodiments of the present system and method discussed here general employ switching device types 115 of MOSFETS and/or IGBTs, other multiple different switching device types 115 may be employed within the scope of this disclosure and of the appended claims, including for example and without limitation: GaN (Gallium Nitride), and/or IGCT (integrated gate-commutated thyristor), and IEGT (injection-enhanced gate transistor).

First Exemplary MST HPEBB LRU

FIG. 6 illustrates an exemplary multi-switch types hybrid power electronics building block line replacement unit (MST HPEBB LRU) 603.1 according to one or more embodiments of the present system and method.

Multiple elements of MST HPEBB LRU 603.1 are the same or similar to elements of exemplary HPEBB LRU 103 discussed above in conjunction with FIG. 1, and some repeated elements will not be described in detail here.

The exemplary MST HPEBB 603.1 is configured for direct current (DC) to alternating current (AC) conversion, that is DC-to-AC or AC-to-DC. The exemplary MST HPEBB 603.1 may include lower voltage bridge converters 110.1 with lower voltage switching devices 115.1, and one or more higher voltage bridge converter(s) 110.3 and higher voltage power switches 115.3. The individual bridge converters 110 are labelled, from left-to-right, as converters 110.1-1, 110.1-2, 110.1-3 (all lower voltage), and 110.3 (higher voltage). The lower voltage stage is referred to as the 'A' stage and the higher voltage stage as the 'B' stage, with 'A' and 'B' referring to the lower (A) and higher (B) voltages. However, it will be noted that the B stage may include lower voltage power switches (such as in exemplary bridge converter 110.1-3).

In the exemplary embodiment 603 of the present system and method, a power switch 115 is implemented as being a power transistor 617 configured in parallel with a diode 618. Diodes 618 are so-called "freewheeling diodes" or "flyback diodes", which are used to protect the circuit from unusual damage caused due to abrupt reduction in the current flowing through the circuit. Persons skilled in the relevant arts will appreciate that a power switch 115 may be implemented so as to include other combinations of one or more power transistors 617 and other components, such as GaN wide band gap devices, JFET, IGCT, IEGT and diodes 618, within the scope of the present system and method.

In the exemplary HPEBB LRU 603.1 of FIG. 6, a total of four bridge converters 110 are employed. In alternative embodiments, a total of two, three, or more than four bridge converters 110 may be used.

In some embodiments, the components (such as power switches 115) within a bridge converter 110 are electrically coupled as shown FIG. 6, with both series and parallel connections. Persons skilled in the relevant arts will appreciate that a bridge converter 110 may be implemented with other connection topologies, within the scope of the present system and method. In some embodiments, a bridge converter 110 is implemented via discrete devices, such as discrete power switches 617 and diodes 618. In an alternative embodiment, a bridge converter 110 may be implemented as an integrated module.

It will also be understood that (making partial reference to legacy PEBB LRU terminology), the low voltage components 110.1, 115.1 may be referred to as PEBB 1000 elements; while the high voltage elements may be referred to as PEBB 3000 elements.

Transformer: The exemplary embodiment of FIG. 6 also illustrates a 1:1 high frequency (HF) transformer 620 configured to link the two lower voltage converters 110.1-2 and 110.1-3. The transformer 620 provides for power transfer via voltage coupling, while also providing for current isolation between the low voltage A stage and the high voltage B stage (the input and output stages). In some embodiments of the present system and method, the transformer may be employ a ferrous, high-frequency, amorphous core 645 made of silicon-steel (SS) core 645, or may be composed from other amorphous core materials which have high magnetic permeability; this material choice for the core 645 may decrease eddy currents and so reduce core power losses.

FIG. 6 illustrates one exemplary configuration for electrical connection among the bridge converters 110 and high frequency transformer 620 of the MST HPEBB LRU 603.1. Where the connections are the same or similar to those illustrated and described with respect to the HPEBB LRU 103 of FIG. 1, the details are not repeated here except where variations apply as disclosed in this section.

Voltage Boosting with Si IGBT Power Devices: In the exemplary MST HPEBB 603.1 of FIG. 6—and unlike the exemplary HPEBB 103 of FIG. 1, where the K:N transformer 120 provides the voltage boost—the voltage boost is provided by a boost power bridge converter 110.3 which includes two sub-modules: (i) a half-bridge sub-module 630, which provides for the voltage boosting, and (ii) a full-bridge sub-module 632 which supports DC/AC conversions.

The boost power bridge converter 110.3 is implemented with Si IGBT switches 115.3. In the exemplary MST HPEBB 603.1 of FIG. 6, the Si IGBT modules 115.3 are rated at 4.5 kV, 150A for a 3 kV DC (link) voltage on the "high" side of the PEBB LRU (PEBB 3000). The PEBB 3000 bridge converter may also be described as an "outer power conversion stage" on the right hand or high voltage (B) side of the exemplary MST HPEBB LRU 603.

It will be noted that the configuration of the high-voltage power bridge output-end converter 110.3 is repeated in some of the other exemplary power converters 603.2, 603.4, 603.5 discussed below in conjunction with FIGS. 7, 9, and 10 respectively. However, exemplary power converter 603.3, discussed below in conjunction with FIG. 8, employ a different configuration for a high-voltage power bridge output-end converter 603.3".

Second Exemplary MST HPEBB LRU

FIG. 7 illustrates another exemplary multi-switch types hybrid power electronics building block line replacement unit (MST HPEBB LRU) 603.2 according to one or more embodiments of the present system and method. Many elements of exemplary MST HPEBB LRU 603.2 are the same or similar to those discussed above with respect to exemplary HPEBB LRU 103 and exemplary MST HPEBB LRU 603.1, and the details are not repeated here.

Exemplary MST HPEBB LRU 603.2 is configured for DC-to-AC conversation. While exemplary HPEBB LRU 603.1 (FIG. 6, immediately above) employed SiC MOSFET devices/modules 115.1 in the outer left-most PEBB 1000 bridge converter 110.1-1, the second exemplary HPEBB LRU 603.2 of FIG. 7 instead employs 1.7 kV Si IGBT devices/modules 115.4 in the left-most PEBB 1000 bridge converter 110.1-1.

This further-hybridized version with Si IGBT modules in the outer power bridges on both the left- and the right-hand sides 110.1-1, 110.3 further reduces cost by leveraging matured and cost-effective 1.7 kV Si IGBTs that are: (i) readily available and (ii) more widely used in hybrid and electrical vehicles and other industrial applications.

Third, Fourth, and Fifth Exemplary MST HPEBB LRUs

FIGS. 8, 9, and 10 illustrates additional, exemplary multi-switch types hybrid power electronics building block line replacement unit (MST HPEBB LRUs) 603.3, 603.4, and 603.5 according to one or more embodiments of the present system and method. Many elements of exemplary MST HPEBB LRUs 603.3, 603.4, and 603.5 are the same or similar to those discussed above with respect to exemplary HPEBB LRU 103 and exemplary MST HPEBB LRUs 603.1, 603.2, and the details are not repeated here.

Exemplary embodiments of 603.1, 603.2 of the present system and method, discussed above in conjunction with FIGS. 6 and 7 respectively, are MST HPEBB LRUs 603.1, 603.2 which are configured for DC/AC applications, the direct current being on the lower power (A) side 105.1 and the alternating current on the high voltage (B) side 105.2.

FIG. 8 presents a schematic representation of another exemplary MST HPEBB LRU 603.3 which is configured for AC/DC power conversation, where the high voltage (B) side 105.2 is connected to a megavolt direct current (MVDC) distribution system or source. The low voltage (A) side 105.1 is connected to a low voltage AC source, for example one kilovolts. In one embodiment, exemplary MST HPEBB LRU 603.3 may employ high power, 4.5 kVolt Silicon (SI) IGBT switches 115.3 in the PEBB 3000 converter 110.3", while employing low voltage 1.7 kVolt SiC MOSFETS 115.1 in the left-most PEBB 1000 converter 110.1-1. It will be noted that the right-most the PEBB 3000 converter 110.3" employs two half-bridge sub-modules (as contrasted with exemplary PEBB 3000 100.1 discussed with other embodiments, which employ a half-bridge sub-module 630 in parallel coupling with a full bridge sub-module 632).

FIG. 9 presents a schematic representation of another exemplary MST HPEBB LRU 603.4 which is configured for AC/AC power conversation, where the high voltage (B) side 105.2 is connected to a megavolt alternating current (MV AC) distribution system or source. The low voltage (A) side 105.1 is connected to a low voltage AC source 273.2, for example one kilovolts. In one embodiment, exemplary MST HPEBB LRU 603.3 may employ high power, 4.5 kVolt Silicon (SI) IGBT switches 115.3 in the PEBB 3000 converter 110.3, while employing low voltage 1.7 kVolt SiC MOSFETs 115.1 in the left-most PEBB 1000 converter 110.1-1.

FIG. 10 presents a schematic representation of another exemplary MST HPEBB LRU 603.4 which is configured for AC/AC power conversation, where the high voltage (B) side 105.2 is connected to a megavolt alternating current (MVAC) distribution system or source. The low power (A) side 105.1 is connected to a low voltage AC source 273.2, for example one kilovolts. In one embodiment, exemplary MST HPEBB LRU 603.3 may employ high power, 4.5 kVolt Silicon (SI) IGBT switches 115.3 in the PEBB 3000 converter 110.3, while employing low voltage 1.7 kVolt Si IGBTs 115.4 in the left-most PEBB 1000 converter 110.1-1.

Low Voltages and High Voltages: In the various exemplary embodiments of MST HPEBB LRUs 603.1, . . . , 603.5 discussed above, the low-end source voltages 145 have been described as 1000 volts, and the high-end voltages 155 as 2000 volts. Persons skilled in the relevant arts will appreciate that these voltages are exemplary only. Lower or higher input voltages 145 and higher or lower output voltages 155 may be employed within the scope of the present system and method.

Exemplary End-Bridge Configurations

As illustrated in the various exemplary embodiments of MST HPEBB LRUs 603.1, . . . , 603.5, some discussed above, various embodiments of the present system and method may employ, for the left-most, low-power bridge converter 110.1-1, either: (i) a half-bridge converter (as for example MST HPEBB LRUs 603.1, 603.2 of FIGS. 6 and 7); or (ii) a full-bridge converter (as for example MST HPEBB LRUs 603.3, 603.4, 603.5 of FIGS. 7, 8, 9).

Similarly, the right-most, high-voltage bridge converter 110.3, may either be: (i) two half-bridge converter subunits 630, 634 with parallel capacitive coupling, making for a full-bridge converter 110.3" (as for example MST HPEBB LRU 603.3 of FIG. 8); or (ii) a combined converter 110.3\* which has a half-bridge converter subunit 630 with parallel capacitive coupling to full-bridge converter 632 (as for with example MST HPEBB LRUs 603.1, 603.2, 603.4, 603.5 of FIGS. 6, 7, 9, and 10).

Field-Configurable AC/DC options: In some embodiments of the present system and method, the use of full-bridge on both ends of an MST HPEBB LRU 603 (as for example shown with exemplary MST HPEBB LRUs 603.3, 603.4, 603.5 of FIGS. 8, 9 and 10) enables the HPEBB LRU to be field-configurable for switching for power conversion modes between any of AC/AC, DC/DC, AC/DC and DC/AC.

Buck/Boost Options: In some alternative embodiments, of two-half bridges at both the low-power end and the high-power end enables the MST HPEBB LRU 603 to be field-reconfigured as either a buck converter or a boost converter.

Size/Weight Tradeoffs: At the same time, for reasons of conserving space, reducing weight, and reducing cost, it is desirable to use only half-bridges for the left-most and right-most converter stages 110.1-1, 110.3. Therefore, expected usage contexts, customer requirements, cost expectations, and desired degrees of hardware adaptability for the MST HPEBB LRUs 603 will influence specific design choices. In general, and for at least reasons of conserving space, it may be desirable to keep the number of half-bridges the same at the lower-power end and the high-power end (either one half-bridge at each end or a full-bridge at each end).

For a lowest cost and lowest size/weight design, a half-bridge may be employed at each end as per exemplary MST HPEBB LRUs 603.3 of FIG. 8. It will be noted however that such a configuration is limited to DC-to-AC conversation only.

XII. EXEMPLARY MST HPEBB

FIG. 11 provides a schematic illustration of an exemplary MST HPEBB power converter 1103 configured to deliver megawatt scale three-phase power, converting direct current to AC current power.

Here, exemplary HPEBB power converter 1103 employs three exemplary phase converters, 1103.A, 1103.B, 1103.C (or "1103.P", in brief), each of which is a power converter for a single phase A, B, or C of electric power (it being understood that each phase is 120 degrees out of phase with the others). Each exemplary phase converter 1103.P includes four (4) MST HPEBB least replaceable units (LRUs) 603.1, . . . , 603.n. It will be understood that the choice of four MST HPEBB LRUs 603 is exemplary only, and other numbers of such units (such as two, three, five, six or more) may be employed.

The four LRUs 603.n within each phase (A, B, C) are connected 205.1, 205.3 in parallel on both sides of the AFE power stage, enabling dual (un-regulated and regulated) DC buses/links. The four LRUs 103.n are connected 285 in series 205.2 on the AC port/side (the PEBB 3000 side) of the LRUs 603.

Both un-regulated and regulated LVDC (on both sides of the front-end power stage 110.1-1) of the three phases (A, B, and C) are connected 502 in parallel. The neutral 504 on the High Voltage AC side of the three phases are tied together. System controls will manage bi-directional power and energy flows and provide regulated LVDC.

In various exemplary embodiments, the present system and method may entail the use of or integration of control systems 227 for regulation of switches, capacitors, cooling systems, and other factors requiring real-time control. Such control systems 227 may entail the use of microprocessors, digital input/output elements, memory (such a random access memory (RAM) and various forms of non-volatile memory), display systems, audio input and/or audio signalling systems, and/or analogue control elements known in the art or to be developed. Such control systems 227 may employ suitable-coded software, stored in memory, to control various aspects of system operations.

In various different embodiments of the present system, any one bridge converter 110 may be designed and configured to convert alternating current (AC) power to AC power (~/~); alternating current (AC) power to direct current (DC) power (~/=); DC power to AC power (=/~); or DC power to DC power (=/=). A single HPEBB 1103 may employ just one type of bridge converter (for example, AC-to-AC (~/~), or just DC-to-DC (=/=)); or may employ multiple types of bridge converters (such as AC-to-DC (~/=) and DC-to-AC (~/=), or other combinations).

Field Adaptable AC/DC conversions: As discussed above, in some embodiments of the present system and method, a PEBB 3000 110.3 may be field adaptable for multiple different possible types of power conversion, such as DC-to-DC, DC-to-AC, AC-to-DC, and DC-to-AC. (This field adaptability may be achieved, in some embodiments, via the use of three internal half-bridge converters and suitable internal switching.) In one embodiment of the present system and method, the exemplary MST HPEBB Power Converter 1103 may include MST PEBB bridge converters 110.3 which are configured with field-adaptable bridge converters 110.3, thereby enabling MST HPEBB Power Converter 1103 as a whole to be field-adaptable for AC or DC output.

In one embodiment of the MST HPEBB power converter 1103, the converter 1103 may be configured for interfacing with a low voltage DC source/drain 273 in the range of 680 Vdc to 1 kVdc at the low power end, and for interfacing with a medium voltage AC source/drain which may for example be a 13.8 kV AC grid/source application.

The exemplary power converter 1103 employs a total of twelve (12) MST HPEBB LRUs. Compared with legacy power converters, the power converter 1103 reduces the total power converter volume, weight and the number of LRUs; further resulting in increased power density and specific power of the PEBB converter for energy storage (ES) integration in higher than 12 kV medium voltage (MV) applications. For the exemplary MST HPEBB converter 1103 for FIG. 11, the reduction in number of LRUs (as compared with legacy power converters) may be as high as ⅔ reduction in the number of LRUs. (That is, legacy PEBB power converters with similar power capabilities may require approximately thirty-six (36) conventional LRUs.

Even taking into account that the MST HPEBB LRUs may be larger than legacy PEBB LRUs, the total volume for an MST HPEBB according to the present system and method may be reduced by approximately 50% compared with a legacy PEBB1000-based power converter. The result may be an MST HPEBB power converter with approximately twice the power-density of an equivalently power-rated legacy PEBB 1000-based converter. The increased power density will benefit power systems for environments which have constrained space/volume requirements, such as ships.

The exemplary MST HPEBB 1103 may also result in simplified converter hardware, controls, and software due to a significantly fewer number of components and LRUs used, which has the potential to improve reliability.

XIII. FURTHER EMBODIMENTS OF THE MULTI-SWITCH TYPE (MST) HPEBB LRU AND MST HPEBB LRU POWER CONVERTER

The MST HPEBBs LRUs 603 disclosed in the present application differentiate themselves from either or both of legacy PEBBs and the HPEBB LRUs 103 of the parent PCT '0624 application in a number of respects.

The present system and method employs multiple-switch types, namely the mixed use of PEBB 1000 with SiC MOSFETs and PEBB 3000 with Si IGBTs. The high-power (greater than 1.7 kV) Si IGBTs are a matured, available, and reliable high voltage switching technology.

The various elements taught herein, in various combinations and embodiments, may result in:
Lower parts costs (due to the use of commercial off-the-shelf (COTS) components) and reduced production costs, as compared to legacy PEBBs and compared to the HPEBBs of the parent PCT '0624 application;
Suitability for higher than 12 kV MV applications, such as 1 kVDC (ES) to 13.5kV AC MST hybrid PEBB converters;
Reduced volume (up to -⅔ or 67%), compared with equivalent PEBB converter based on PEBB 1000 for same rated power (1 MW);
Increased power density (up to three-fold), compared with equivalent PEBB converter based on PEBB 1000 for same rated power (1 MW), while utilizing the same number twelve (12) of LRUs for the MST hybrid PEBB converter;
Commonality with the PEBB converters for all US Navy ships platforms (present 450V ac, 4160V ac, 13.5 k Vac, and future 6 kV dc and 12 kV dc);
Compact and modular topology configurations;
Simplified hardware, controls, and software due to a reduction in the number of LRUs;
Improved reliability due to reductions in number of LRUs/parts/components per converter.

Cooling

It will be noted that the HPEBB LRUs 103 of the parent PCT '0624 application employed 1:N or K:N transformers 120 for voltage boosting. Due to the heat generated by the 1:N or K:n transformers 120, the transformers 120 may benefit from, or may require, a liquid cooling system 320 of the type discussed above in conjunction with FIG. 3; and/or of the type(s) taught in copending, co-assigned PCT application PCT/US20/26026, "Cooling Systems For Enhanced Power Density Transformers".

The use of a 1:1 lower-voltage transformers 620 in the MST HPEBB LRUs 603 of the present system and method may generate less heat as compared with the 1:N (or K:N) transformer 120 employed in the HPEBB LRUs 103 of the parent PCT '0624 application. In some embodiments of the present system and method, this may result in the 1:1 transformer 620 requiring no liquid cooling system 320. In other embodiments of the present system and method, the 1:1 transformer may still require liquid cooling, as above, but with the use of a more modestly-scaled liquid cooling system 320.

A "more modestly scaled" cooling system 320 may for example employ fewer cooling tubes 365; smaller diameter cooling tubes 365; smaller and/or fewer cold plates 360; a lower pressure and/or a lower liquid-pumping velocity for the coolant fluid; a less expensive coolant fluid (with a lower specific heat capacity); and other cooling system simplifications. Either way, system volume, weight, and cost for cooling purposes may be reduced as compared to the HPEBBs 103 of the PCT '0624 application.

The present system and method benefits from the present-day wide availability and higher reliability of high power Si IGBT switches as opposed to their newer high power SiC MOSFET counterparts. The present system and method is small enough to be able to fit into tightly constrained spaces on board military and commercial ships.

XIV. CONCLUSION

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope of the disclosure. Therefore, it is to be understood that, within the scope of the appended claims, the disclosure may be practiced other than as specifically described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It should be noted that the simulation, synthesis, and/or manufacture of the various embodiments of this invention can be accomplished, in part, through the use of a variety of materials, including metals, non-metals, resins, epoxies, semi-conductors, glass, polymers, ferrous materials, non-ferrous materials, conductors, insulators, and liquids, some known in the art and some yet to be developed.

Where computer code is required for the present system and method, such as for control systems 227 running on microprocessors, computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets.

It is understood that control functions or monitoring functions to be accomplished in conjunction with the systems and techniques described above can be represented in a core (such as a CPU core) that is embodied in program code and can be transformed to hardware via suitable circuits, wireless communications, and/or optical messaging.

It is to be appreciated that the Detailed Description section (and not the Summary and Abstract sections) is primarily intended to be used to interpret the claims. The Summary and Abstract sections may set forth one or more but not all exemplary embodiments of the present invention as contemplated by the inventor(s), and thus, are not intended to limit the present invention and the appended claims in any way.

Further regarding the appended claims, any and all reference signs/numbers are provided to make the claims easier to understand, and are not to be treated as limiting the extent of the matter protected by the claims; their sole function is to provide for clear reference to elements in the disclosure and drawings.

What is claimed is:

1. A multi-switch type hybrid power electronics building block least replaceable unit (MST HPEBB LRU) comprising:
a first end comprising a low-voltage power stage for power transmission at a first voltage, the low-voltage power stage comprising a low-voltage bridge converter, the low-voltage bridge converter comprising a plurality of low-voltage switches of a first fundamental type of switching device which is configured to carry the first voltage;
a second end comprising a high-voltage power stage for power transmission at a second voltage which is higher than the first voltage, the high-voltage power stage comprising a high-voltage power bridge, wherein:
the high-voltage power bridge comprises a plurality of high-voltage switches of a second fundamental type of switching device which is different than the first fundamental type of switching device and comprises (i) a first half-bridge converter being coupled in parallel with a second half-bridge converter; and (ii) a half-bridge converter being coupled in parallel with a full-bridge converter, the half-bridge converter being configured for at least one of boosting voltage and bucking voltage, and the full-bridge converter being configured for coupling with a high-voltage load;
wherein the high-voltage power bridge is configured to carry the second voltage; and
wherein the first end and the second end are voltage coupled and galvanically isolated via a 1:1 transformer.

2. The MST HPEBB LRU of claim 1, wherein:
the low-voltage bridge converter comprises a first fundamental switching device for switching a low voltage while maximizing a power density of the MST HPEBB LRU; and
the high-voltage bridge converter comprises a second fundamental switching device for boosting the first voltage to the second voltage, wherein a voltage buck or boost of the MST HPEBB LRU is provided via the high-voltage bridge converter.

3. The MST HPEBB LRU of claim 1, wherein:
the plurality of low-voltage switches comprise a plurality of Silicon Carbide (SiC) MOSFET switches; and
the plurality of high-voltage switches comprise at least one of:
a plurality of Silicon (Si) IGBT switches,
a plurality of integrated gate-commutated thyristor switches,
and a plurality of injection-enhanced gate transistor switches.

4. The MST HPEBB LRU of claim 3, wherein:
the plurality of SiC MOSFET switches are rated at 2 kVolt or less, and the plurality of Si IGBT switches rated at 3 kVolt or greater.

5. The MST HPEBB LRU of claim 4, wherein:
the plurality of low-voltage switches comprise a plurality of 1.7 kVolt switches and the plurality of high-voltage switches comprise a plurality of 4.5 kVolt switches.

6. The MST HPEBB LRU of claim 1, wherein:
the 1:1 transformer comprises a transformer with an amorphous core.

7. The MST HPEBB LRU of claim 1, wherein:
the first end comprises a first low-voltage bridge converter coupled in parallel with a second low-voltage bridge converter, the first low-voltage bridge converter also having a power port for connection with a low-voltage power resource;
the second end comprises a third low-voltage bridge converter coupled in parallel with the high-voltage bridge converter, the high-voltage bridge converter also having a power port for connection with a high-voltage power resource;
the 1:1 transformer couples the second low-voltage bridge converter with the third low-voltage bridge converter; and
each respective low-voltage bridge converter comprises one respective fundamental type of switching device of the first and second fundamental types of switching devices.

8. The MST HPEBB LRU of claim 1, wherein:
the MST HPEBB LRU is configured with a respective full-bridge converter, at each respective end of the MST HPEBB LRU, and
the MST HPEBB LRU is configured for field-adaptation for any of DC-to-DC power conversion, DC-to-AC power conversion, AC-to-DC power conversion, and AC-to-AC power conversion.

9. The MST HPEBB LRU of claim 1, wherein:
the MST HPEBB LRU comprises a respective full-bridge converter at each respective end of the MST HPEBB LRU, and
the MST HPEBB LRU is configurable for field-adaptation for any of DC-to-DC power conversion, DC-to-AC power conversion, AC-to-DC power conversion, and AC-to-AC power conversion.

10. The MST HPEBB LRU of claim 1, wherein:
the MST HPEBB LRU comprises a respective half-bridge converter, at each respective end of the MST HPEBB LRU, and
the MST HPEBB LRU is configurable for field-adaptation for either of buck conversion or boost conversation.

11. A Multi-Device Type Hybrid Power Electronics Building Block (MST HPEBB) comprising:
a first voltage phase module which comprises a plurality of multi-switch types power electronic building block line replacement units (MST HPEBB LRUs) connected in series, wherein the MST HPEBB further comprises:
(i) a plurality of low-voltage bridge converters each comprising a plurality of low-voltage switches of a first fundamental type of switching device which are configured to carry a first voltage; and
(ii) a plurality of high-voltage bridge converters each comprising a plurality of high-voltage switches of a second fundamental type of switching device, the second fundamental type of switching device comprising (i) a first half-bridge converter being coupled in parallel with a second half-bridge converter; and (ii) a half-bridge converter being coupled in parallel with a full-bridge converter, the half-bridge converter being configured for at least one of boosting voltage and bucking voltage, and the full-bridge converter being configured for coupling with a high-voltage load;
wherein the plurality of high-voltage switches is configured to carry a second voltage which is greater than the first voltage.

12. The MST HPEBB of claim 11, wherein:
the plurality of low-voltage switches comprises a plurality of SiC MOSFET switches rated at 2 kVolt or less, and the plurality of high-voltage switches comprises a plurality of SI IGBT switches rated at 3 kVolt or greater.

13. The MST HPEBB of claim 11, wherein:
the MST HPEBB is field-adaptable for any of DC-to-DC power conversion, DC-to-AC power conversion, AC-to-DC power conversion, and AC-to-AC power conversion.

* * * * *